(12) United States Patent
Ware et al.

(10) Patent No.: US 11,533,077 B2
(45) Date of Patent: *Dec. 20, 2022

(54) PSEUDO-DIFFERENTIAL SIGNALING FOR MODIFIED SINGLE-ENDED INTERFACE

(71) Applicant: Rambus Inc., San Jose, CA (US)

(72) Inventors: Frederick Ware, Los Altos Hills, CA (US); Carl Werner, Los Gatos, CA (US)

(73) Assignee: Rambus Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/023,169

(22) Filed: Sep. 16, 2020

(65) Prior Publication Data

US 2021/0067197 A1 Mar. 4, 2021

Related U.S. Application Data

(63) Continuation of application No. 16/544,475, filed on Aug. 19, 2019, now Pat. No. 10,812,138.

(60) Provisional application No. 62/765,390, filed on Aug. 20, 2018.

(51) Int. Cl.
*H04B 3/32* (2006.01)

(52) U.S. Cl.
CPC ..................... *H04B 3/32* (2013.01)

(58) Field of Classification Search
CPC ... G05F 1/56; G05F 1/59; G05F 1/567; G06F 11/10; G06F 13/42; G06F 15/17; H02H 3/22; H03K 3/00; H03K 5/00; H03K 5/22; H03K 5/153; H03K 17/16; H03K 19/094; H03K 19/0175; H03L 5/00; H04B 3/32; H04B 14/04
USPC .......... 326/26, 33, 81, 82; 327/64, 108, 333, 327/379, 391, 538, 554; 375/254, 257, 375/353; 702/64
See application file for complete search history.

(56) References Cited

U.S. PATENT DOCUMENTS

| | | |
|---|---|---|
| 5,424,629 A | 6/1995 | Fujiwara et al. |
| 5,712,586 A | 1/1998 | Kitao |
| 5,936,896 A | 8/1999 | Cho et al. |
| 5,942,808 A | 8/1999 | Kaneko et al. |
| 5,994,950 A | 11/1999 | Ochi |
| 6,087,885 A | 7/2000 | Tobita |
| 6,184,717 B1 | 2/2001 | Crick |
| 6,195,395 B1 | 2/2001 | Frodsham |
| 6,340,852 B1 | 1/2002 | Mizoguchi |
| 6,504,353 B2 | 1/2003 | Kobayashi et al. |
| 6,522,193 B2 | 2/2003 | Shin |
| 6,621,328 B2 | 9/2003 | Koike et al. |
| 6,744,298 B2 | 6/2004 | Yamauchi et al. |
| 6,744,689 B2 | 6/2004 | Itou |
| 6,784,718 B2 | 8/2004 | Okamoto et al. |
| 6,798,236 B2 | 9/2004 | Shimizu et al. |
| 6,833,748 B2 | 12/2004 | Cho |
| 6,944,003 B2 | 9/2005 | Sugimoto et al. |

(Continued)

*Primary Examiner* — Shawkat M Ali
(74) *Attorney, Agent, or Firm* — Womble Bond Dickinson (US) LLP

(57) ABSTRACT

Disclosed is a signaling circuit. A switch circuit generates an internal reference supply voltage and an internal lower supply voltage, from first and second power supply voltages. A transmit circuit drives a high bit from the first power supply voltage, and drives a low bit from the internal lower supply voltage. The second terminal of the data output is connected to the internal reference supply voltage.

18 Claims, 36 Drawing Sheets

(56) References Cited

U.S. PATENT DOCUMENTS

| | | |
|---|---|---|
| 6,946,876 B2 | 9/2005 | Isezaki et al. |
| 7,009,426 B2 | 3/2006 | Dosho et al. |
| 7,102,413 B2 | 9/2006 | Kuroda |
| 7,102,952 B2 | 9/2006 | Lee et al. |
| 7,558,128 B2 | 7/2009 | Shin et al. |
| 7,593,280 B2 | 9/2009 | Kim |
| 7,684,261 B2 | 3/2010 | Matano |
| 7,902,871 B2 | 3/2011 | Noh et al. |
| 8,004,311 B2 | 8/2011 | Kim et al. |
| 8,421,501 B1 | 4/2013 | Rien et al. |
| 8,513,976 B2 | 8/2013 | Chang et al. |
| 8,605,397 B2 | 12/2013 | Poulton et al. |
| 9,568,934 B2 | 2/2017 | Hong |
| 9,608,633 B1 | 3/2017 | Liu et al. |
| 9,755,644 B2 | 9/2017 | Yamada |
| 2008/0001656 A1 | 1/2008 | Takeuchi |
| 2008/0116943 A1 | 5/2008 | Nair |
| 2009/0045844 A1 | 2/2009 | Noh et al. |
| 2009/0289668 A1 | 11/2009 | Baldisserotto et al. |
| 2012/0176156 A1* | 7/2012 | Chang ................ H04L 25/0278 326/62 |
| 2013/0113524 A1* | 5/2013 | Rueger ................ H03F 3/3022 327/109 |
| 2014/0044157 A1 | 2/2014 | Chang et al. |

\* cited by examiner

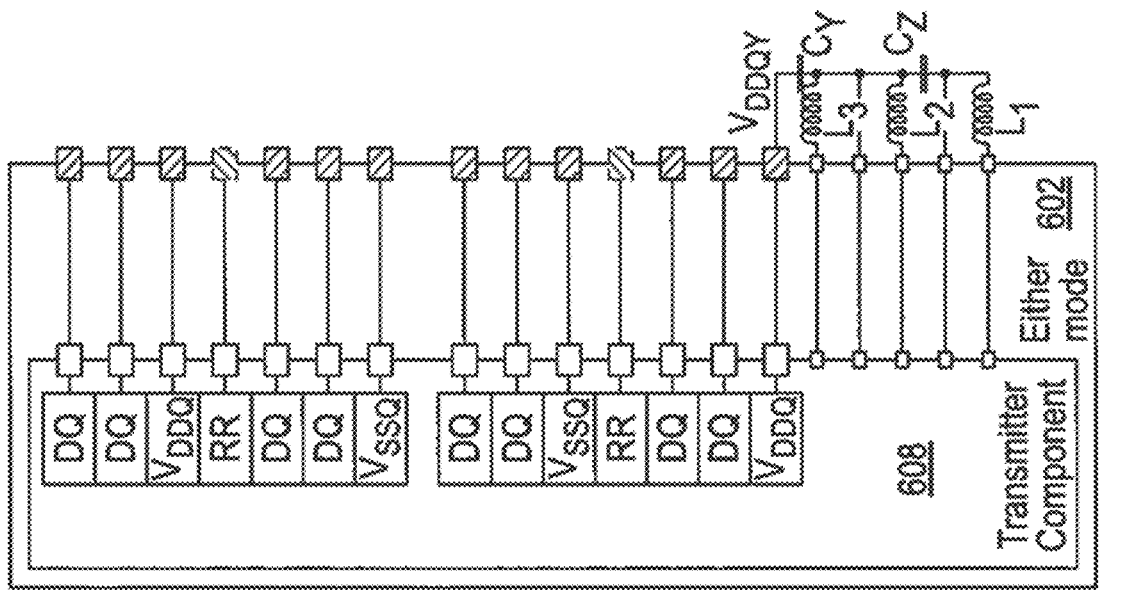
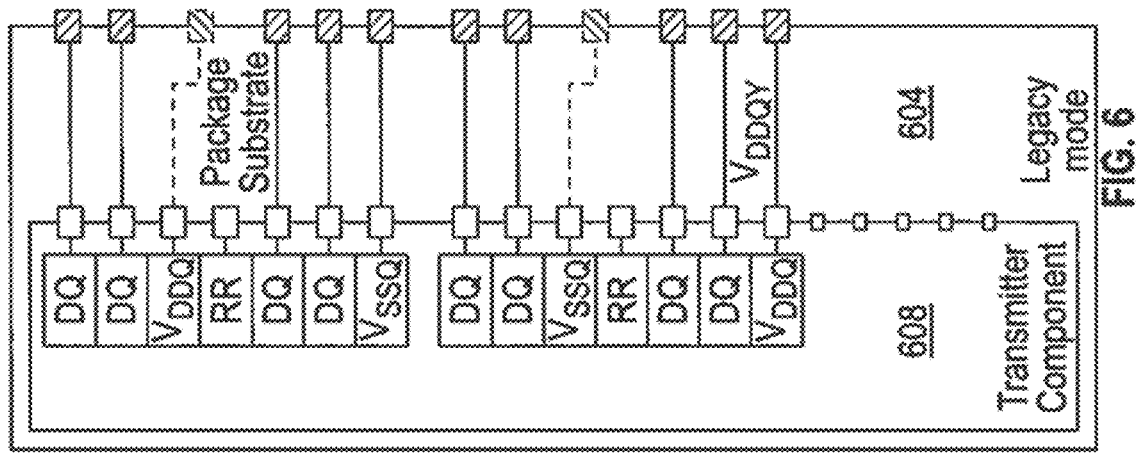
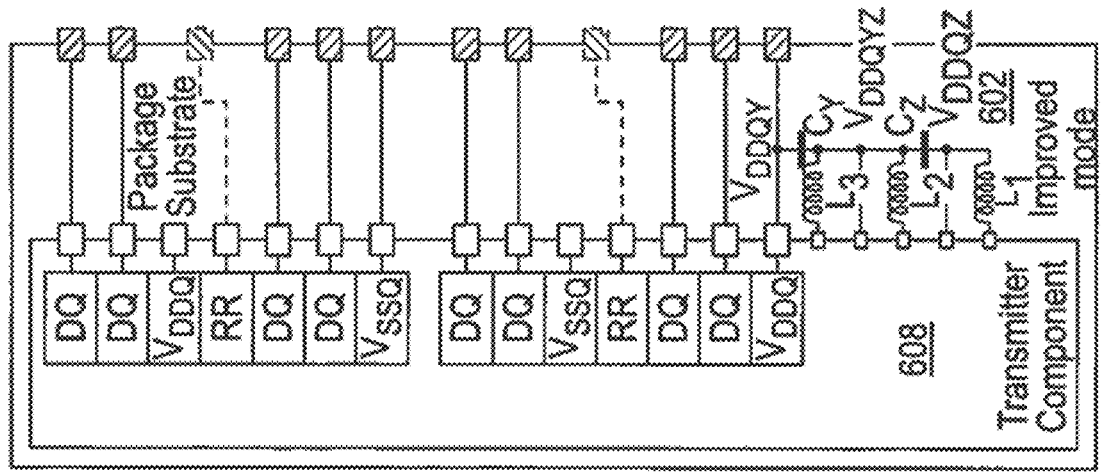
FIG. 6

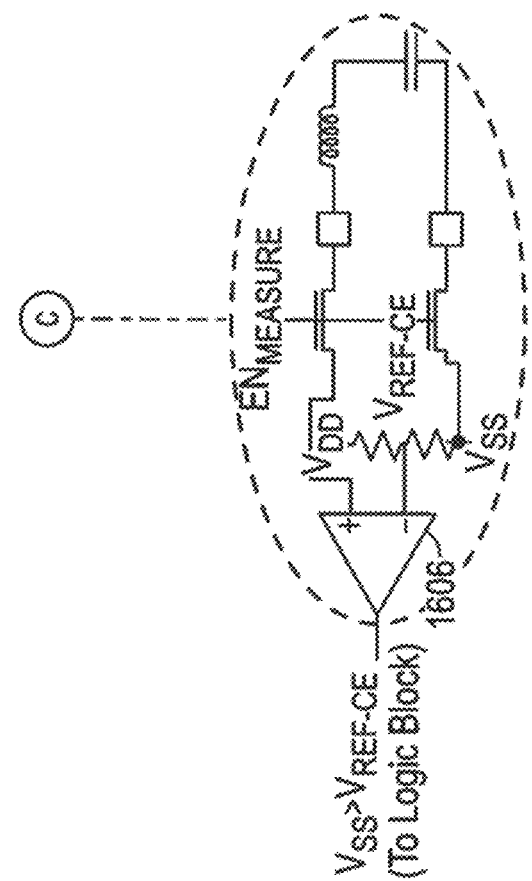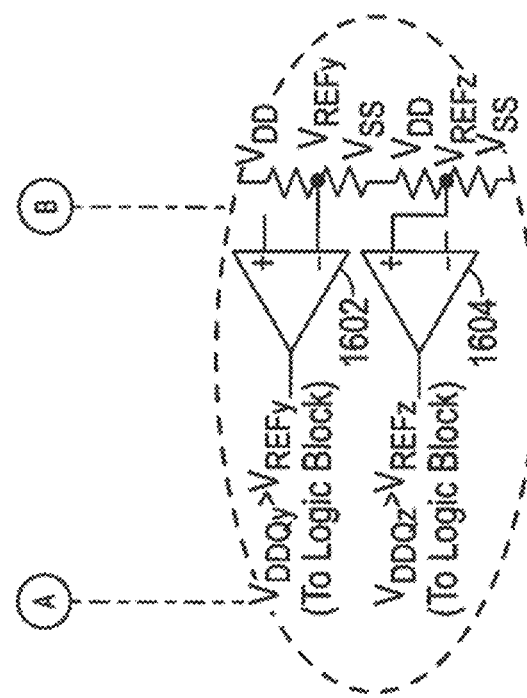
FIG. 16
(Continued)

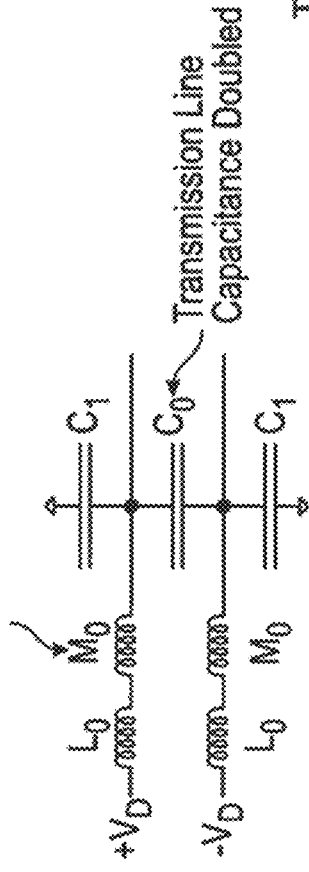
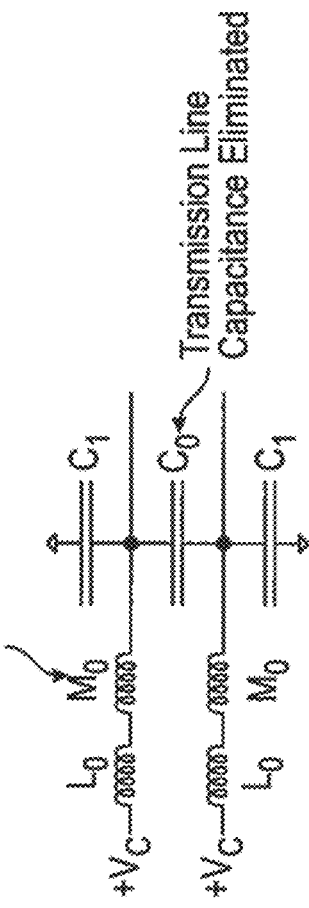
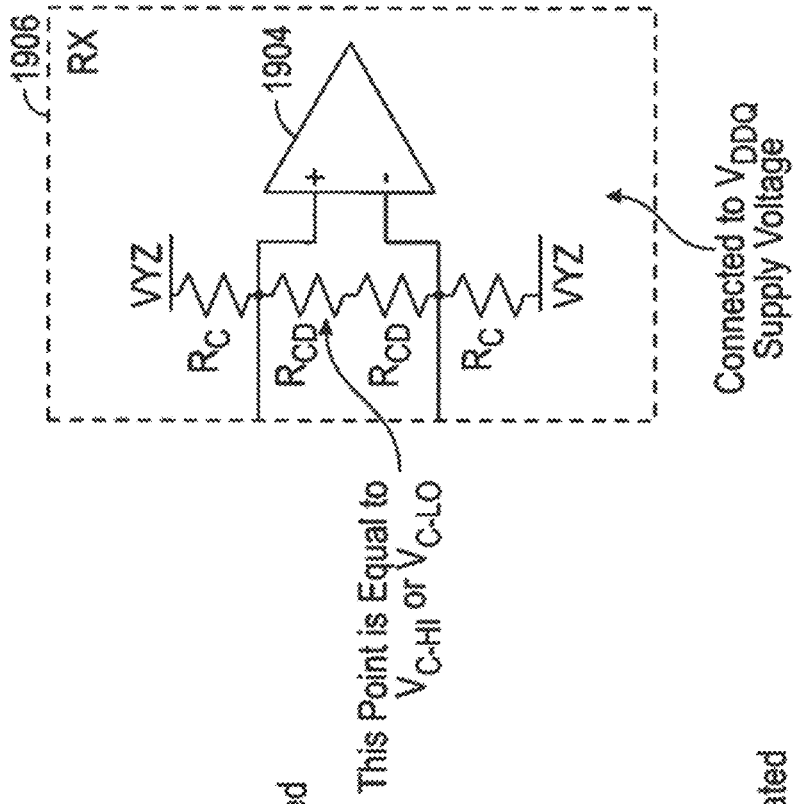
FIG. 19
(Continued)

PSEUDO-DIFFERENTIAL SIGNALING FOR MODIFIED SINGLE-ENDED INTERFACE

CROSS REFERENCE TO RELATED APPLICATIONS

This application is a continuation of U.S. patent application Ser. No. 16/544,475, filed Aug. 19, 2019, which claims the benefit of U.S. Provisional Patent Application No. 62/765,390, filed on Aug. 20, 2018, which are hereby incorporated by reference in their entirety.

BACKGROUND

Single-ended signaling circuits typically drive out a high bit or low bit on one terminal of a transmitter output. Usually, single-ended signaling uses one wire for each signal, and one wire for the ground or other common reference voltage of all of the signals. A ground or common reference voltage connection may provide shielding for the signals, and also a return path for signaling current. The high bit and the low bit are detected in a receiver circuit, typically using a differential amplifier. Different amounts of current for the high bit versus the low bit can cause noise on the return current path, which can couple to the signaling path. This may affect neighboring signal integrity, causing signal interference or crosstalk especially in high speed signaling.

Differential signaling uses twice as many wires as there are signals, as each bit is transmitted using complementary signals on two wires, and may use a common ground or common reference voltage for all of the signals, for example for shielding.

BRIEF DESCRIPTION OF THE DRAWINGS

The present disclosure will be understood more fully from the detailed description given below and from the accompanying drawings of various embodiments of the disclosure.

FIG. 6 illustrates packaging and external component options for embodiments.

DETAILED DESCRIPTION

Figure 1:
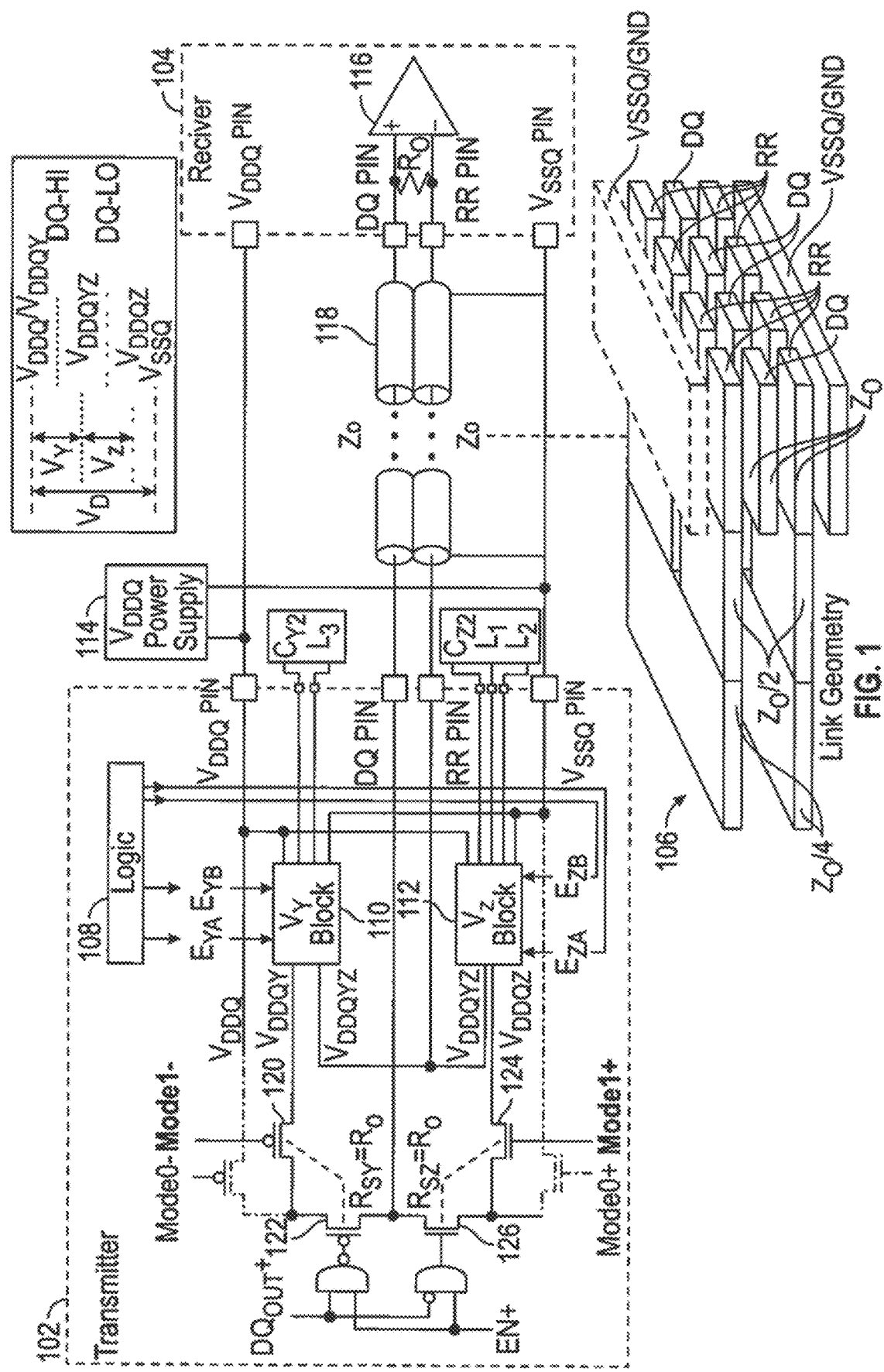
FIG. 1 illustrates an embodiment of a transmitter, receiver, and link geometry of a pseudo-differential signaling circuit.

In the following description, various aspects of the illustrative embodiments will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials and configurations are set forth in order to provide a thorough understanding of the illustrative embodiments. However, it will be apparent to one skilled in the art that the present disclosure may be practiced without the specific details. In other instances, well-known features are omitted or simplified in order not to obscure the illustrative embodiments.

Embodiments of a pseudo-differential signaling circuit described herein have aspects of single-ended signaling and differential signaling in various combinations and may have some or all of the features described below. One embodiment is a transmitter circuit for an integrated circuit (IC). Some versions have two modes of operation, a legacy mode for single-ended signaling using open drain connection, and an improved mode for pseudo-differential signaling. A switching circuit (or switch circuit), which is inductor and capacitor-based in one version, and is a capacitor-based charge pump in another version, generates an internal reference voltage and an internal, lower power supply voltage from two power supply voltage rails, an upper power supply voltage and a lower power supply voltage. In pseudo-differential signaling mode, the upper power supply voltage rail is used by a transmitter circuit for driving a high bit on one of a pair of data output terminals and the internal, lower power supply voltage is used for driving a low bit on that same terminal of the data output. The internal reference voltage is connected to the other terminal of the pair of data output terminals, and serves as both a reference voltage for signaling and a return path for signaling current. A receiver circuit has a differential amplifier with a termination resistor across the differential inputs. The lower power supply voltage is used for shielding both of the signal lines between transmitter and receiver.

A legacy mode can be integrated such that other signaling schemes can be effected using the existing structures of the transmitter circuits so that backwards compatibility can be achieved. In legacy mode, the upper power supply voltage is used by the transmitter circuit for driving a high bit, and the lower power supply voltage is used for driving a low bit. The internal reference voltage and internal, lower power supply voltage are not used and may be turned off. A receiver circuit has a comparator (which could also be a differential amplifier) with a termination resistor connecting the single-ended terminal to the upper power supply voltage. The lower power supply voltage is used for shielding the single-ended signal line.

FIG. 1 illustrates an embodiment of a transmitter 102, receiver 104, and link geometry 106 of a pseudo-differential signaling circuit. Switching (or switch) logic 108 operates $V_Y$ block 110 and associated external (or in some versions, internal) capacitor $C_{Y2}$ and inductor L3, and $V_Z$ block 112 and associated external (or in some versions, internal) capacitor $C_{Z2}$ and inductors L1 and L2. That is, $V_Y$ block 110 and $V_Z$ block 112 include the $V_Y$ and $V_Z$ circuits and the $C_{Y2}$, L3, $C_{Z2}$, L1 and L2 components. The switching logic and components produce an internal reference voltage $V_{DDQYZ}$ and an internal, lower power supply voltage $V_{DDQZ}$, from an upper power supply voltage $V_{DDQ}$ and a lower power supply voltage $V_{SSQ}$ supplied by the $V_{DDQ}$ power supply 114. Generally, the internal reference voltage $V_{DDQYZ}$ is between the upper power supply voltage $V_{DDQ}$ and the lower power supply voltage $V_{SSQ}$, and the internal, lower power supply voltage $V_{DDQZ}$ is between the internal reference voltage $V_{DDQYZ}$ and the lower power supply voltage $V_{SSQ}$. In some versions, the upper power supply voltage $V_{DDQ}$, internal reference voltage $V_{DDQYZ}$, and internal, lower power supply voltage $V_{DDQZ}$ are equally spaced (i.e., an equal amount of voltage apart to within some tolerance). These internally produced voltages are used for pseudo-differential signaling, in mode 1.

When mode 1 is selected, and push pull logic is enabled by the enable signal, for example labeled EN+, the transmitter 102 drives out the data value of the data signal, for example labeled $DQ_{OUT}+$ through the DQ pin, which is one of the two data out terminals. The other of the two data out terminals, RR pin, is connected to the internal reference voltage $V_{DDQYZ}$. Signal lines for the data out terminals, labeled DQ and RR are shielded by the lower power supply voltage, $V_{SSQ}$, connected to a shield conductor of the shielded signal line 118 in the version shown in FIG. 1, e.g., the outer conductor of coaxial cables or one or more ground planes in a printed circuit board. Depending on the data value of the data signal driven out through the one of the two data out terminals, labeled DQ, transmitter 102 drives out a high bit, from the upper power supply voltage $V_{DDQ}$, or drives out a low bit, from the internal, lower power supply voltage $V_{DDQZ}$. In the embodiment of the circuit version shown, there is impedance matching. The two series PMOSFETs 120, 122 in the transmit "1" path (one PMOSFET 120 connected to $V_{DDQY}$ or $V_{DDQ}$ for the mode 1 select, another PMOSFET 122 for driving the high bit) are impedance matched to each other for a combined resistance equal to the termination resistance $R_0$ between the differential inputs of the differential amplifier 116 in the receiver 104. This impedance matching produces a voltage, for the high bit at the receiver 104, that is midway between the upper power supply voltage $V_{DDQ}$ and the internal reference voltage $V_{DDQYZ}$. Similarly, the two series NMOSFETs 124, 126 in the transmit "0" path (one NMOSFET 124 connected to $V_{DDQZ}$ for the mode 1 select, another NMOSFET 126 for driving the low bit) are impedance matched to each other for a combined resistance equal to the termination resistance $R_0$ between the differential inputs of the differential amplifier 116 in the receiver 104. This impedance matching produces a voltage, for the low bit at the receiver 104, that is midway between the internal reference voltage $V_{DDQYZ}$ and the internal, lower power supply voltage $V_{DDQZ}$. In embodiments with equally spaced upper power supply voltage $V_{DDQ}$, internal reference voltage $V_{DDQYZ}$, and internal, lower power supply voltage $V_{DDQZ}$, transmit supply current through the upper power supply voltage $V_{DDQ}$ and the lower power supply voltage $V_{SSQ}$ is the same for driving the low bit as for driving the high bit, to within a tolerance.

Since the transmitter 102 drives out only one terminal, the circuit in both mode 0 and mode 1 shares this characteristic with single-ended signaling. But, since two signals are sent out in mode 1 (e.g., in separate, shielded signal lines 118) and their voltage difference is differentially sensed at the receiver 104, the circuit shares this characteristic with differential signaling. Thus, signaling in mode 1 is referred to as a pseudo-differential signaling. Shielded signal lines 118 can be implemented in coaxial cable or with link geometry 106, as depicted in FIG. 1, for example as microstrips with layers in printed circuit boards, and in various further embodiments as readily devised. In the embodiment shown in FIG. 1, the DQ lines are sandwiched between RR lines, and each RR DQ RR stack is sandwiched between ground planes.

Figure 2:
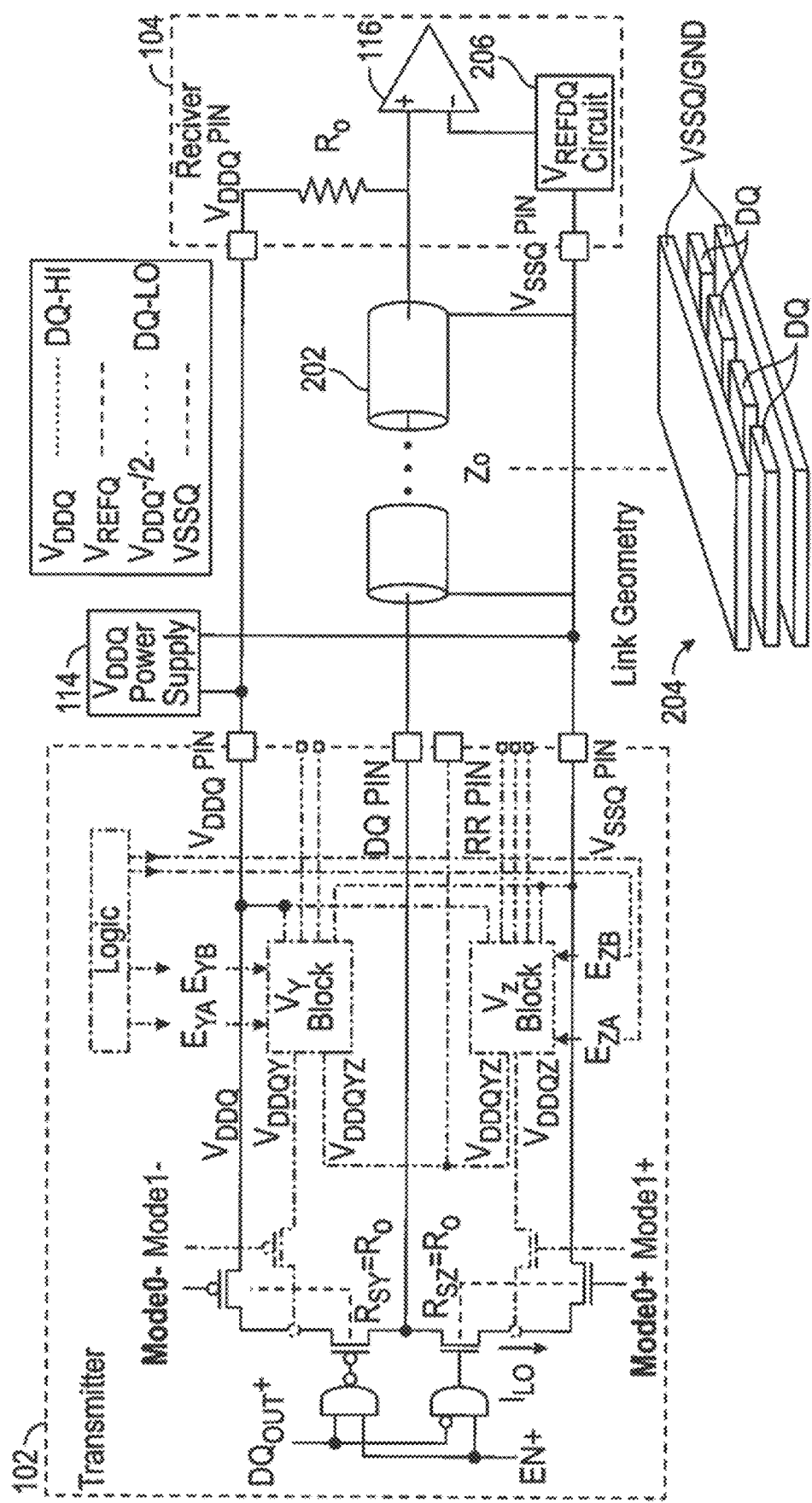
FIG. 2 illustrates a legacy mode operation of the pseudo-differential signaling circuit of FIG. 1, performing single-ended signaling, in an embodiment.

FIG. 2 illustrates a legacy mode operation of the pseudo-differential signaling circuit of FIG. 1, performing single-ended signaling, in an embodiment. When mode 0 is selected for legacy mode, and push pull logic is enabled by the EN+, the transmitter 102 drives out the data value of $DQ_{OUT}+$ through the data out terminal, the DQ pin. In this example, the lower power supply voltage is used for shielding the data output signal line DQ, e.g., by connecting $V_{SSQ}$ to the outer conductor of a coaxial cable or one or more ground planes in a printed circuit board. Depending on the data value, transmitter 102 drives out a high bit, from the upper power supply voltage $V_{DDQ}$, or drives out a low bit, from the lower power supply voltage $V_{SSQ}$. In the circuit version shown, there is impedance matching by design. The two series PMOSFETs in the transmit "1" path (one connected to $V_{DDQ}$ for the mode 0 select, another for driving the high bit) are impedance matched to each other for a combined resistance equal to the termination resistance $R_0$ connecting the positive differential input of the differential amplifier 116 to the upper power supply voltage $V_{DDQ}$ in the receiver 104. This impedance matching produces a voltage, for the high bit at the receiver 104, that is at the upper power supply voltage $V_{DDQ}$. Similarly, the two series NMOSFETs in the transmit "0" path (one connected to the lower power supply voltage $V_{SSQ}$ for the mode 0 select, another for driving the low bit) are impedance matched to each other for a combined resistance equal to the termination resistance $R_0$ connecting the positive differential input of the differential amplifier 116 to the upper power supply voltage $V_{DDQ}$ in the receiver 104. This impedance matching produces a voltage, for the low bit at the receiver 104, that is midway between the upper power supply voltage $V_{DDQ}$ and the lower power supply voltage $V_{SSQ}$. In the circuit embodiment shown in FIG. 2, the differential amplifier 116 is operated as a comparator, with a reference voltage $V_{REFQ}$ produced by a reference voltage circuit 206, labeled $V_{REFDQ}$ circuit, as an input to the negative terminal of the differential amplifier 116 or comparator. This and other voltage references can be produced by known mechanisms, such as voltage dividers, bandgap circuits, Zener diodes, diode stacks, etc.

Since the transmitter 102 drives out only one terminal, and the data signal line is sent out in a single shielded signal line 202, the circuit shares this characteristic with single-ended signaling. Further, the sensing in the receiver 104 is a single-ended, rather than true differential sensing. Thus, signaling in mode 0 is referred to as single-ended signaling. Shielded signal line 202 can be implemented in coaxial cable or with link geometry 204, as depicted in FIG. 2, for example as microstrips with layers in printed circuit boards, and in various further embodiments as readily devised. In the embodiment shown in FIG. 2, the DQ lines are sandwiched between ground planes for shielding.

Figure 3:
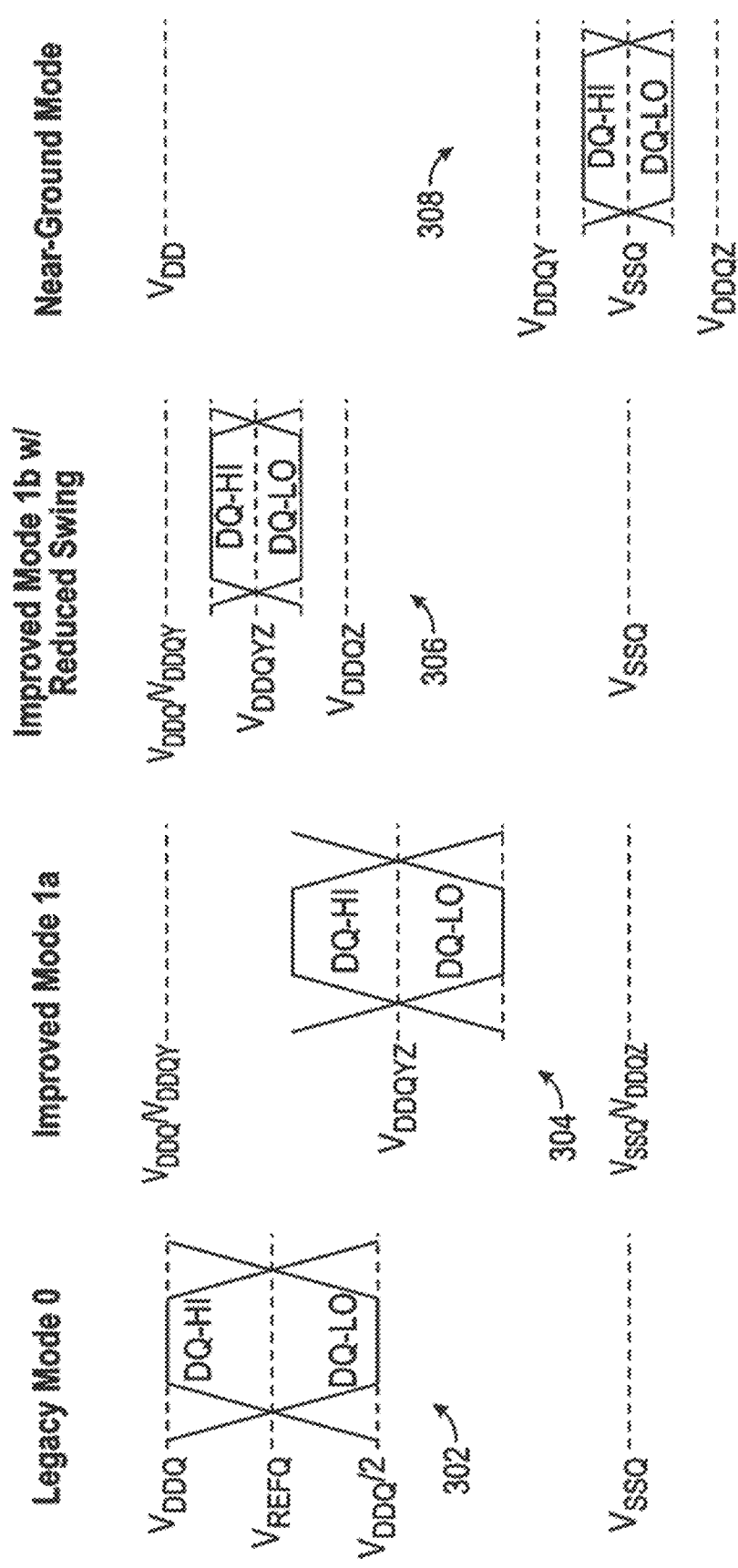
FIG. 3 illustrates signal levels for legacy and improved modes.

FIG. 3 illustrates signal levels for legacy and improved modes. In legacy mode 0, data signaling 302 has a high bit DQ-HI that is at the upper power supply voltage $V_{DDQ}$, and a low bit DQ-LO that is at $V_{DDQ}/2$ (see description of FIG. 2). These high bit and low bit voltage levels are centered about a reference voltage $V_{REFQ}$.

Mode 1 data signaling has various possible levels, depending on adjustment of generated voltage levels, in various embodiments. Improved mode 1a data signaling 304 has a high bit DQ-HI that is midway between the upper power supply voltage $V_{DDQ}$ and the internal reference voltage $V_{DDQYZ}$, which is set at midway between the upper power supply voltage $V_{DDQ}$ and the lower power supply voltage $V_{SSQ}$. A low bit DQ-LO is midway between the internal reference voltage $V_{DDQYZ}$ and the lower power supply voltage at $V_{DDQ}$. These high bit and low bit voltage levels are centered about the internal reference voltage $V_{DDQYZ}$. One way to accomplish this is to set the internal, lower power supply voltage $V_{DDQZ}$ to the lower power supply voltage $V_{SSQ}$.

Improved mode 1b data signaling 306 with reduced swing has a high bit DQ-HI that is midway between the upper power supply voltage $V_{DDQ}$ and the internal reference voltage $V_{DDQYZ}$, which is set at midway between the upper power supply voltage $V_{DDQ}$ and the internal, lower power supply voltage $V_{DDQZ}$. A low bit DQ-LO is midway between the internal reference voltage $V_{DDQYZ}$ and the internal, lower power supply voltage at $V_{DDQZ}$. These high bit and low bit voltage levels are centered about the internal reference voltage $V_{DDQYZ}$. One way to accomplish this is to set the internal, lower power supply voltage $V_{DDQZ}$ to a level below the upper power supply $V_{DDQ}$ and above the lower power supply voltage $V_{SSQ}$.

Near ground mode data signaling 308, also with reduced swing, has a high bit DQ-HI that is midway between $V_{DDQY}$ and the lower power supply voltage $V_{SSQ}$. A low bit DQ-LO is midway between the lower power supply voltage $V_{SSQ}$ and $V_{DDQZ}$. These high bit and low bit voltage levels are centered about the lower power supply voltage $V_{SSQ}$. One way to accomplish this is to set the internal, lower power supply voltage $V_{DDQZ}$ to a level below the lower power supply voltage $V_{SSQ}$.

Figure 4:
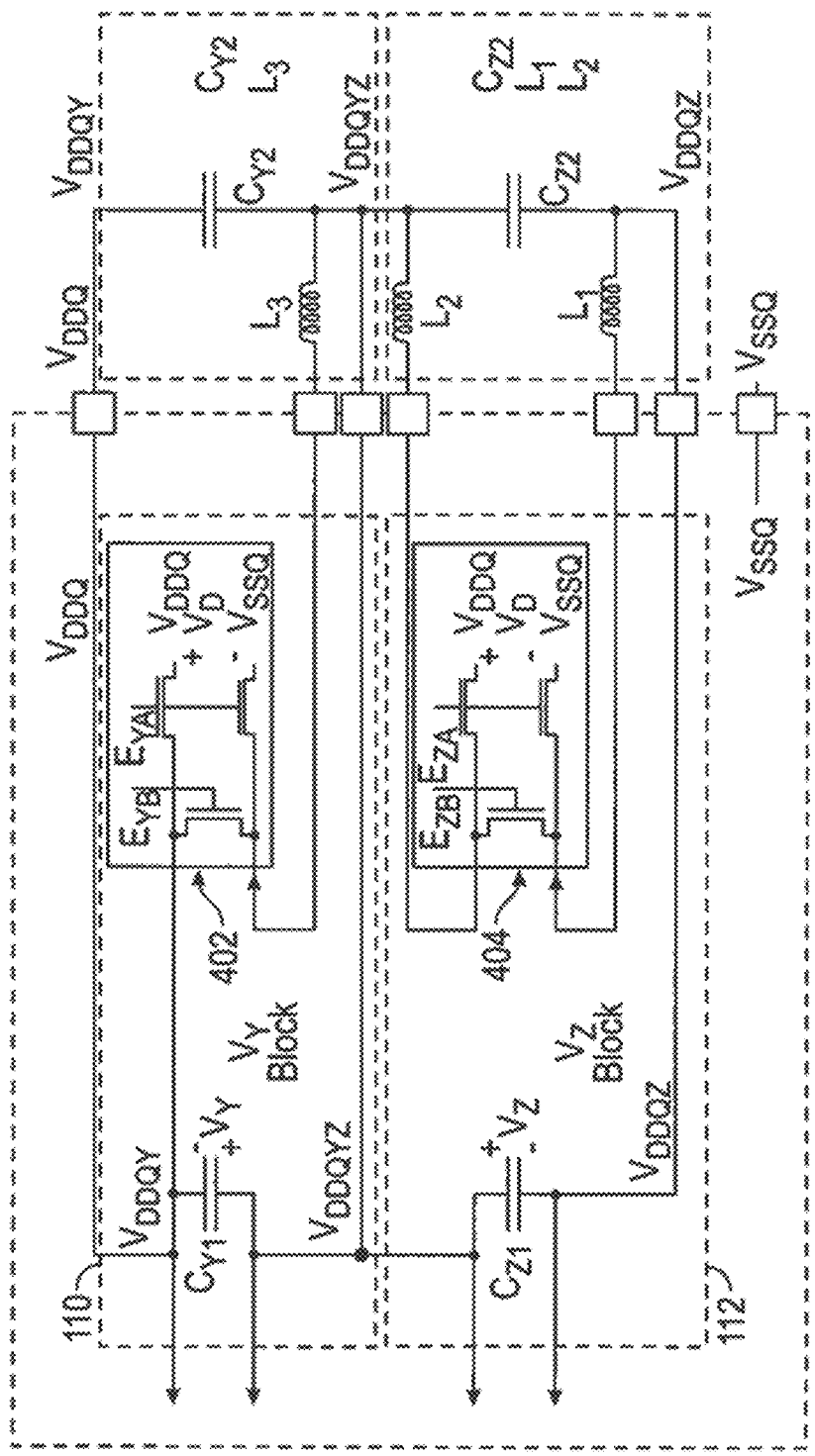
FIG. 4 illustrates switched-inductor operation, to generate an internal reference supply voltage and an internal lower supply voltage for use in the pseudo-differential signaling circuit of FIG. 1, in an embodiment.

FIG. 4 illustrates switched-inductor operation, to generate an internal reference supply voltage and an internal lower supply voltage for use in the pseudo-differential signaling circuit of FIG. 1, in an embodiment. Similarly to FIG. 1, $V_Y$ block 110 and $V_Z$ block 112 include the $V_Y$ and $V_Z$ circuits and the $C_{Y2}$, L3, $C_{Z2}$, L1 and L2 components. The $V_Y$ block 110 has pass gates 402 coupled to an internal capacitor $C_{Y1}$, an external capacitor $C_{Y2}$ and an external inductor L3. The internal and external capacitors are in parallel to each other between the upper power supply voltage $V_{DDQ}$ and the internal reference voltage $V_{DDQYZ}$, and in a variation could be just an internal capacitor or just an external capacitor. The pass gates 402 are operated to pass charge from the upper power supply voltage $V_{DDQ}$ and lower power supply voltage $V_{SSQ}$ to the inductor L3, and from the inductor to the capacitor(s), as directed by the switching logic 108 (see FIG. 1).

The $V_Z$ block 112 has pass gates 404 coupled to an internal capacitor $C_{Z1}$, an external capacitor $C_{Z2}$ and external inductors L1 and L2. The internal and external capacitors are in parallel to each other between the internal reference voltage $V_{DDQYZ}$ and the internal, lower power supply voltage $V_{DDQZ}$, and in a variation could be just an internal capacitor or just an external capacitor. The pass gates 404 are operated to pass charge from the upper power supply voltage $V_{DDQ}$ and lower power supply voltage $V_{SSQ}$ to the inductors L1 and L2, and from the inductors to the capacitor(s), as directed by the switching logic 108 (see FIG. 1).

Figure 5:
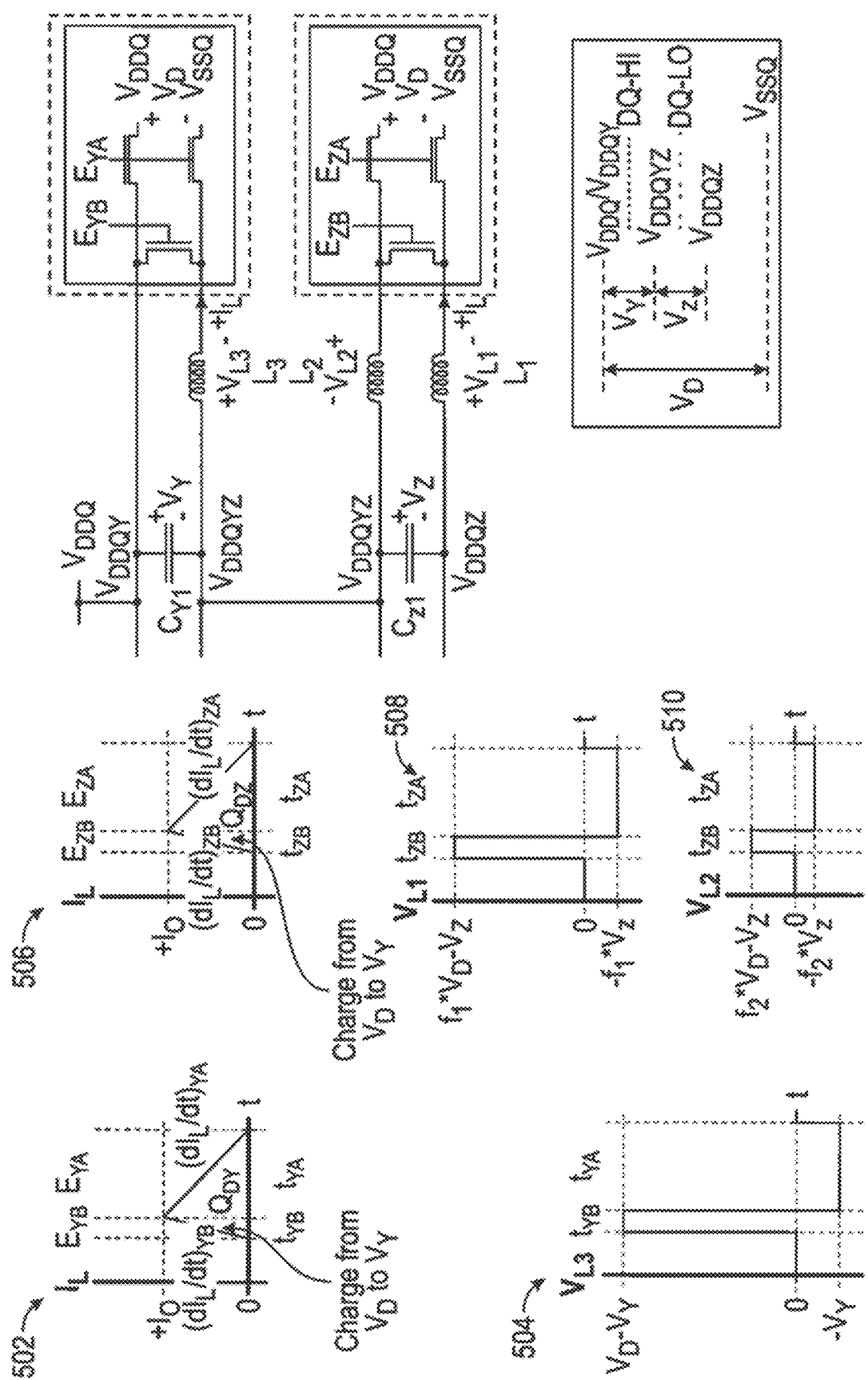
FIG. 5 illustrates voltages and currents for switched-inductor operation.

FIG. 5 illustrates voltages and currents for switched-inductor operation. For inductor L3, the graph of inductor current 502 shows $I_L$ for a transfer of charge $Q_{DY}$ from $V_D$ to $V_Y$. The graph of inductor voltage 504 shows $V_{L3}$ across L3 for this transfer of charge $Q_{DY}$.

For inductors L1 and L2, the graph of inductor current 506 shows $I_L$ for a transfer of charge $Q_{DZ}$ from $V_D$ to $V_Z$. The graph of inductor voltage 508 shows $V_{L1}$ across L1 for this transfer of charge $Q_{DZ}$. The graph of inductor voltage 510 shows $V_{L2}$ across L2 for the transfer of charge $Q_{DZ}$.

Some embodiments of the switching logic 108 park the inductors, ending a charging cycle with zero current through and zero voltage across each inductor, for example as shown at the right end of each of the above inductor current and voltage graphs.

FIG. 6 illustrates packaging and external component options for embodiments. For an improved mode, using mode 1 and pseudo-differential signaling, the package substrate 602 mounts external inductors L1, L2 and L3 and external capacitors $C_Y$ and $C_Z$ internal to the package and connects a subset of transmitter component 608 pads to package pins. For legacy mode, using mode 0 and single-ended signaling, the package substrate 604 does not mount any external inductors or capacitors, and connects a different subset of transmitter component 608 pads to package pins. For either mode operation, using modes 0 and 1 (e.g. as selected by a user), the package substrate 606 mounts external inductors L1, L2 and L3 and external capacitors $C_Y$ and $C_Z$, external to the substrate 606 and connects all of the transmitter component 608 pads to package pins.

Figure 7:
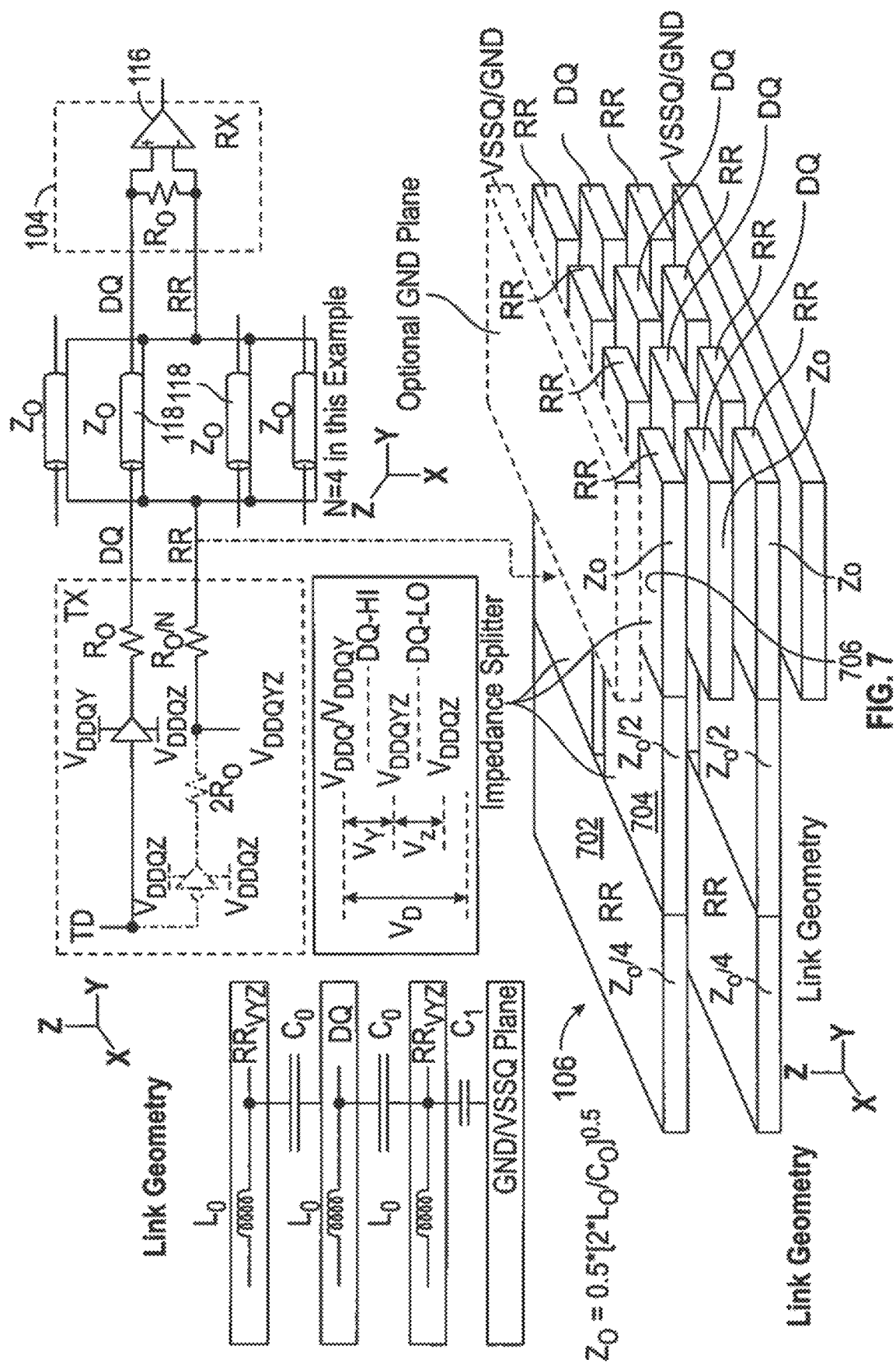
FIG. 7 illustrates termination and link geometry details for an embodiment of transmitter and receiver using pseudo-differential signaling.

FIG. 7 illustrates termination and link geometry details for an embodiment of transmitter and receiver using pseudo-differential signaling. The link geometry 106 can be used for shielded signal lines 118 as shown in FIG. 1 and also as shown in FIG. 7. One geometry of the link has a shared region 702 that connects via a transmitter interface to the internal reference voltage $V_{DDQYZ}$ through the second terminal, RR, of the transmitter 102 data output, which is herein shown in equivalent form. The shared region 702 splits with impedance matching into multiple regions 704, which split again with impedance matching into multiple regions 706. Each of the regions 706 of RR accompanies a data signal, DQ. Not shown, but readily envisioned as a mirror image of the link geometry 106 shown in FIG. 7, the multiple regions 706 of RR rejoin into multiple regions similar to the regions 704, which then rejoin into a second shared region similar to the shared region 702. The second shared region connects the internal reference voltage $V_{DDQYZ}$ through a receiver interface, to the negative input of the differential amplifier 116 of the receiver 104.

Figure 8:
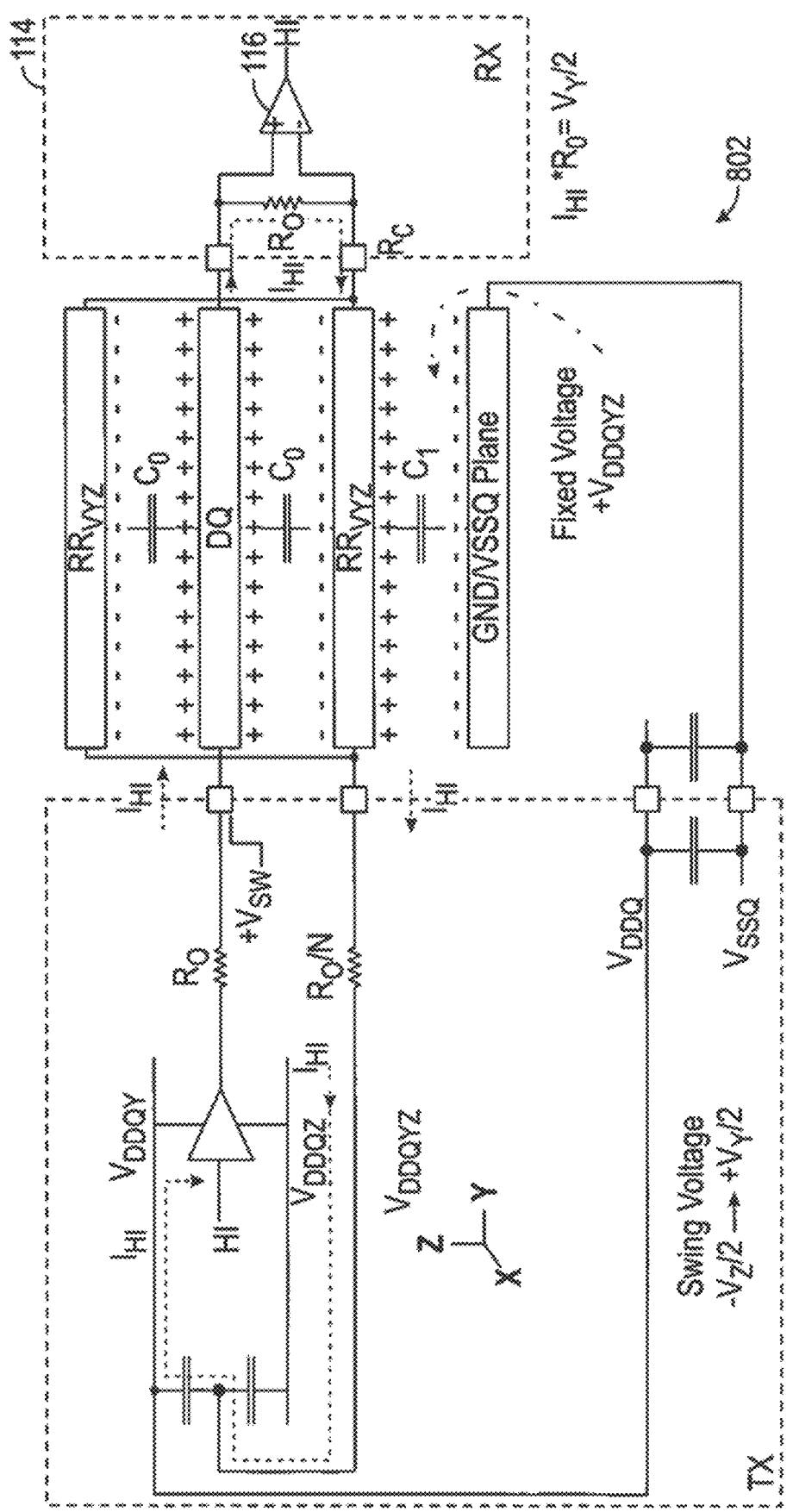
FIG. 8 illustrates charge flow for a high bit and a low bit in pseudo-differential signaling, in an embodiment.
Figure 8:
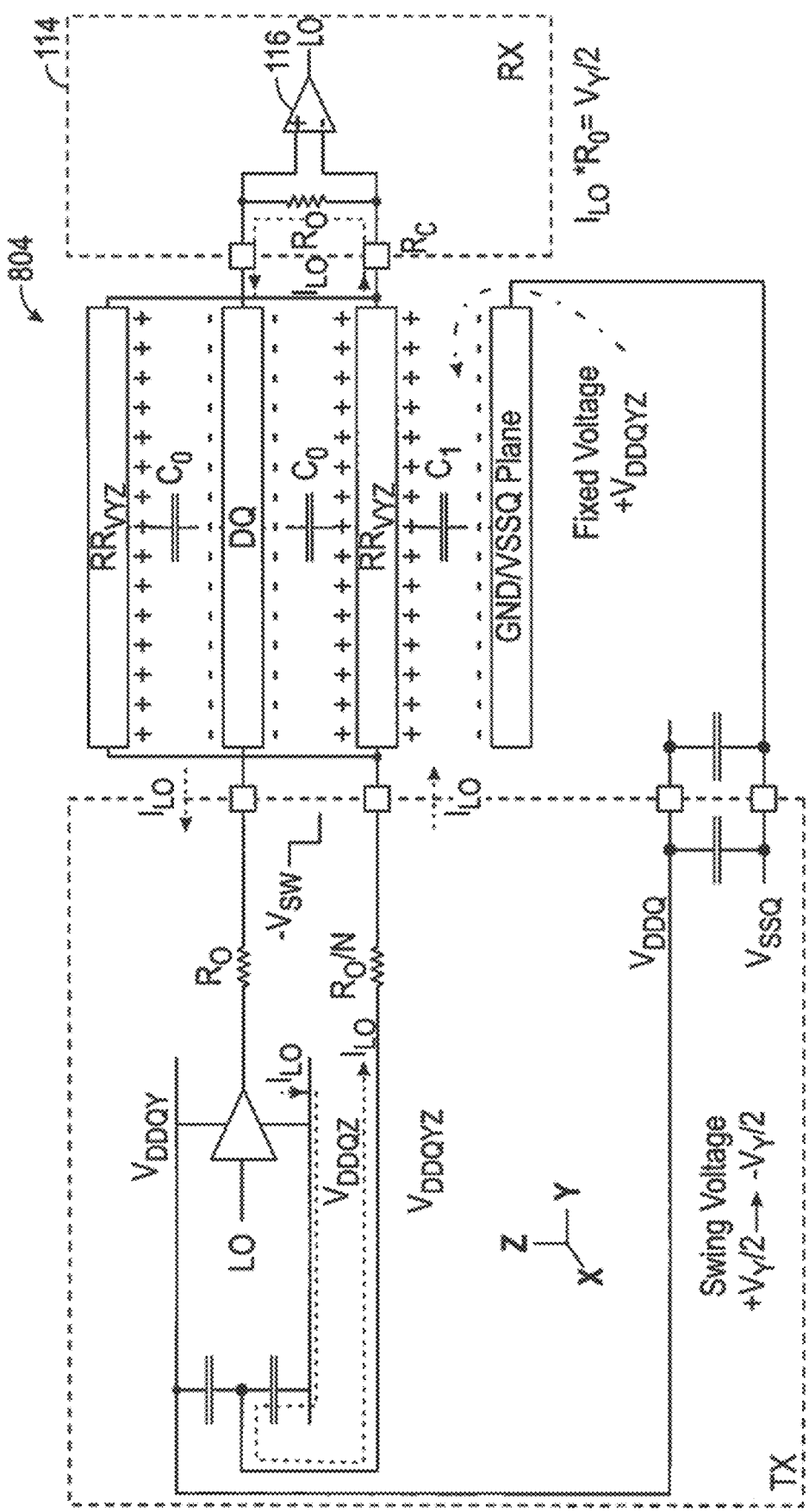

FIG. 8 illustrates charge flow for a high bit and a low bit in pseudo-differential signaling, in an embodiment. In the upper half of the diagram, for a swing voltage from $-V_Z/2$ to $+_{vy}/2$, the charge flow 802 shown as current $I_{HI}$ is clockwise, through the termination resistor across the terminals of the differential amplifier 116 in the receiver 104. In the lower half of the diagram, for a swing voltage from $+V_Y/2$ to $-V_Z/2$, the charge flow 804 shown as current $I_{HI}$ is counterclockwise, through the termination resistor across the terminals of the differential amplifier 116 in the receiver 104. For both cases, the internal reference voltage $V_{DDQYZ}$ is a fixed voltage.

Figure 9:
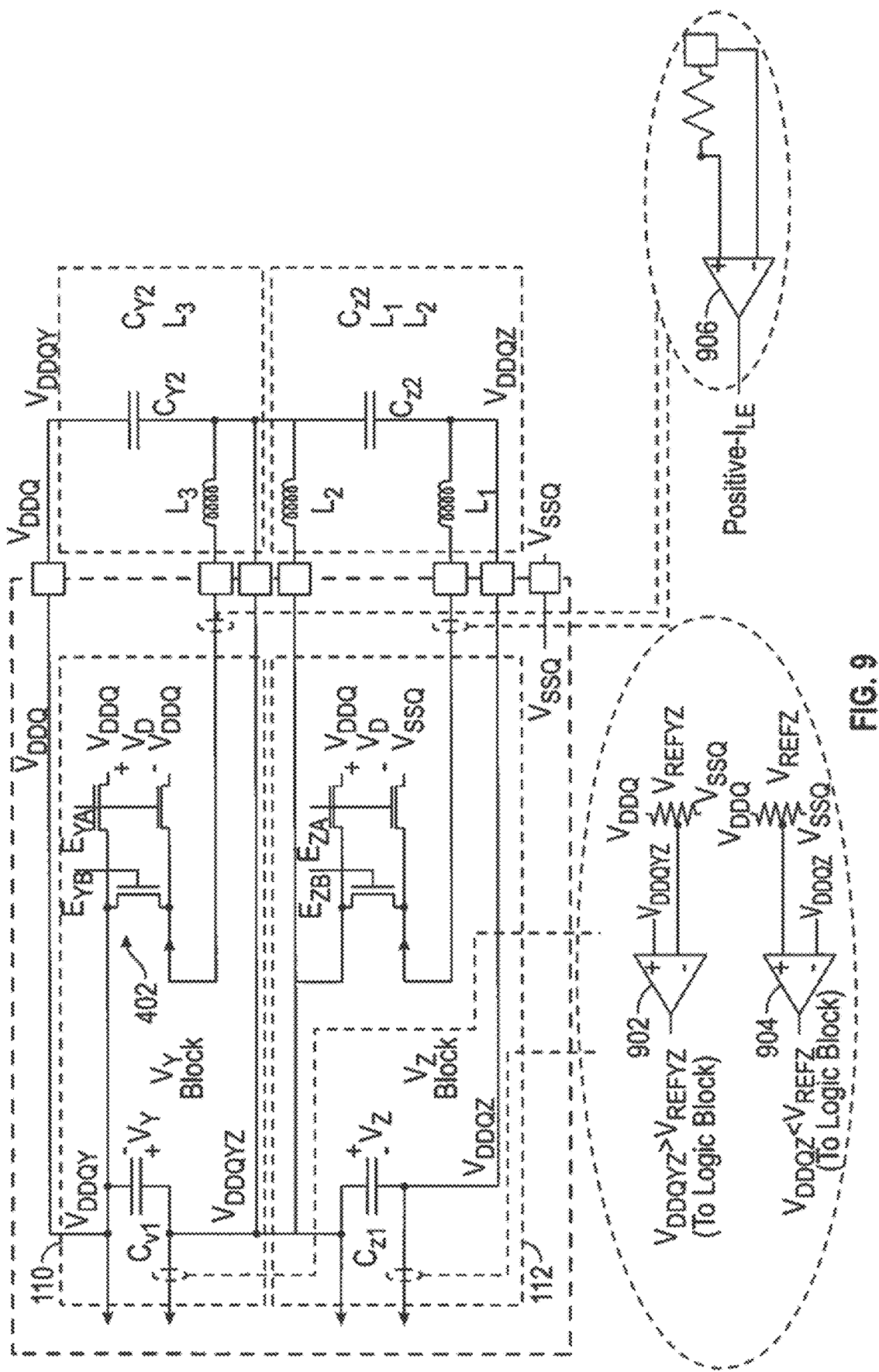
FIG. 9 illustrates voltage comparators monitoring voltages for embodiments of switching logic.

FIG. 9 illustrates voltage comparators 902, 904, 906 monitoring voltages for embodiments of switching logic 108. In this example, the switching logic 108 (see FIG. 1) operates pass gates 402, 404 (see FIG. 4) to transfer charge to and from the inductors and capacitors, in generating the internal reference voltage $V_{DDQYZ}$ and the internal, lower power supply voltage $V_{DDQZ}$, according to the voltages and currents illustrated in FIG. 5, based on these monitored voltages. One comparator 902 monitors $V_{DDQYZ}$ in comparison to voltage reference $V_{REFYZ}$. Another comparator 904 monitors $V_{DDQZ}$ in comparison to voltage reference $V_{REFZ}$. And, one comparator 906 determines direction of current, which could be instanced twice, once for inductor L1 and another for inductor L3. In variations, voltages across capacitors or across inductors could be monitored. In various embodiments, switching logic 108 could be based on a state machine, or processor-based, etc., with inputs from the voltage comparators 902, 904, 906. For example, the switching regulator clock can be duty cycle modulated. A duty cycle modulator controls the duty cycle of the switching signals Eyv and EYA and signals Eza and Ezb. Comparators 903 and 904 would create an error signal that controls the clock duty cycle and therefore the regulated voltage outputs.

Figure 10:
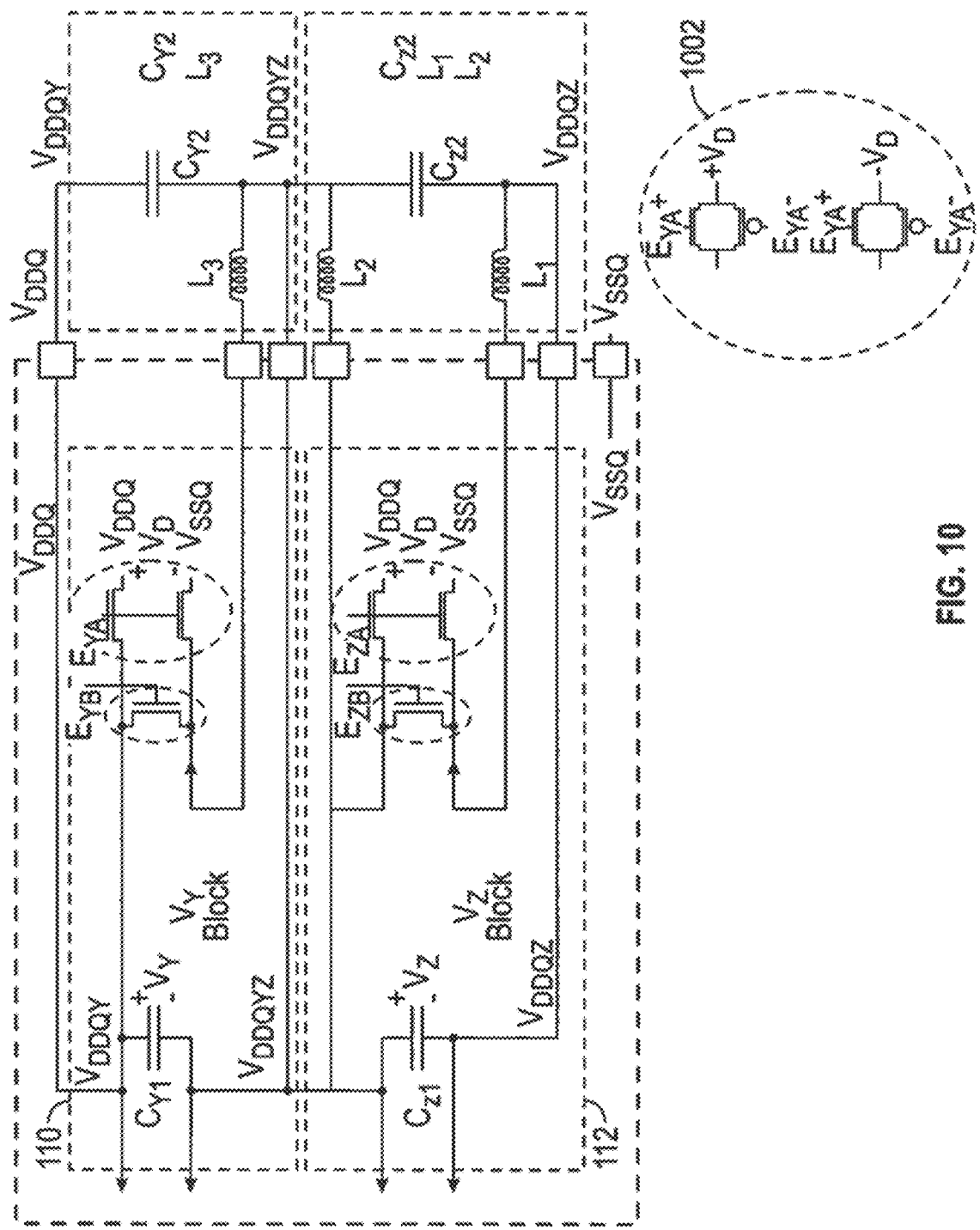
FIG. 10 illustrates variations with pass gates, and internal or external inductors and capacitors.

FIG. 10 illustrates variations with pass gates, and internal or external inductors and capacitors. The pass gates in the $V_Y$ block 110 and $V_Z$ block 112 are shown in FIG. 1 as single-sided pass gates (e.g., NMOSFETs), but could be implemented with complementary or double-sided pass gates 1002 (e.g., CMOS with one side NMOSFET and the other side PMOSFET). Also, as shown in FIG. 10, the inductors and capacitors can be implemented internally in some versions.

Figure 11:
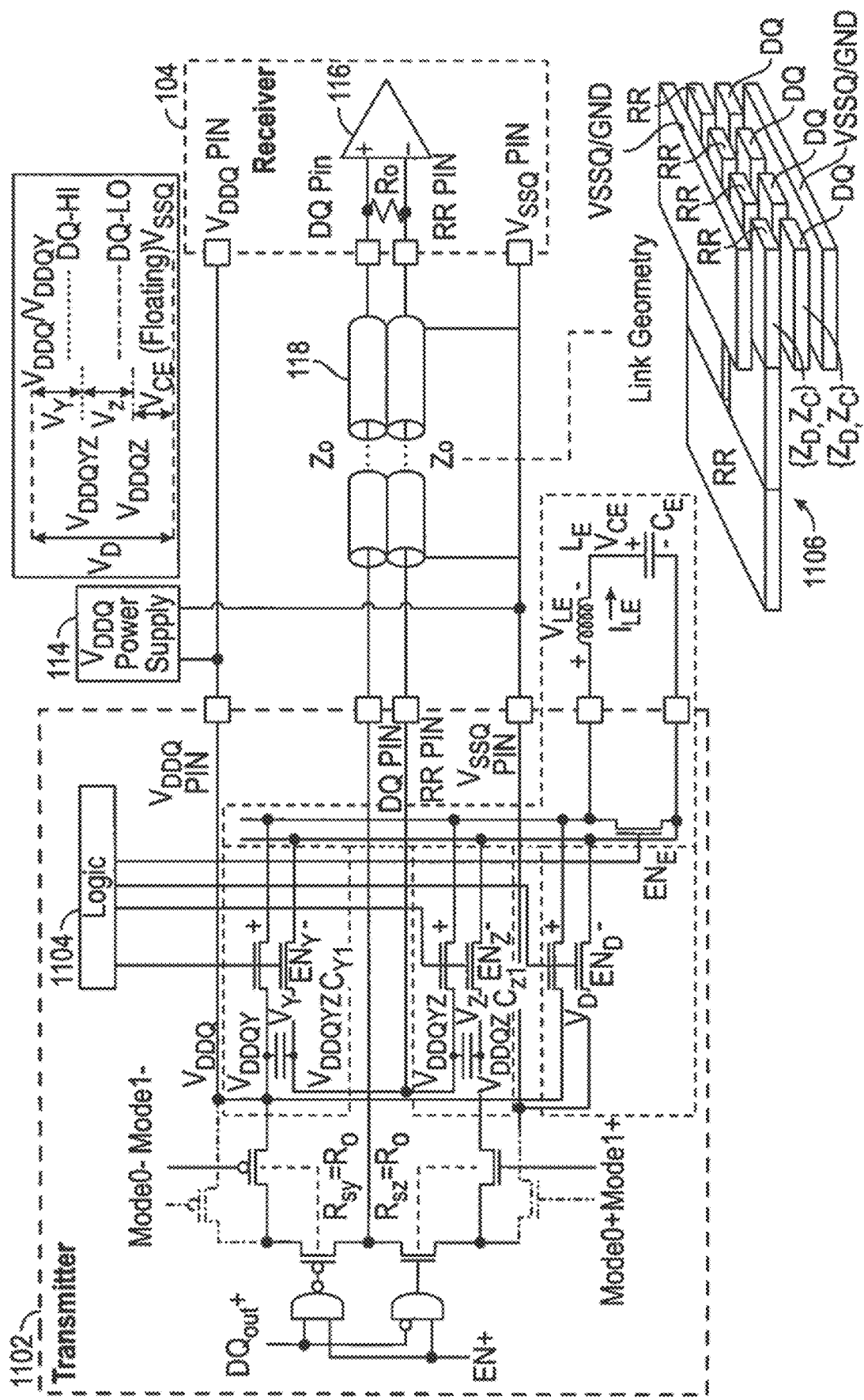
FIG. 11 illustrates a further embodiment of a pseudo-differential signaling circuit.

FIG. 11 illustrates a further embodiment of a pseudo-differential signaling circuit. Here, a single external inductor $L_E$ in series with an external capacitor $C_E$ transfer charge from upper power supply voltage $V_{DDQ}$ and lower power supply voltage $V_{SSQ}$ to internal capacitors $C_{Y1}$ and $_{cz1}$, to generate the internal reference voltage $V_{DDQYZ}$ and the internal, lower power supply voltage $V_{DDQZ}$. Switching logic 1104 operates the pass gates in a related manner to that described above with reference to FIGS. 1, 4, 5 and 9. Mode 0 and mode 1 operation, and operation of the receiver 104, are similar to the above.

Figure 12:
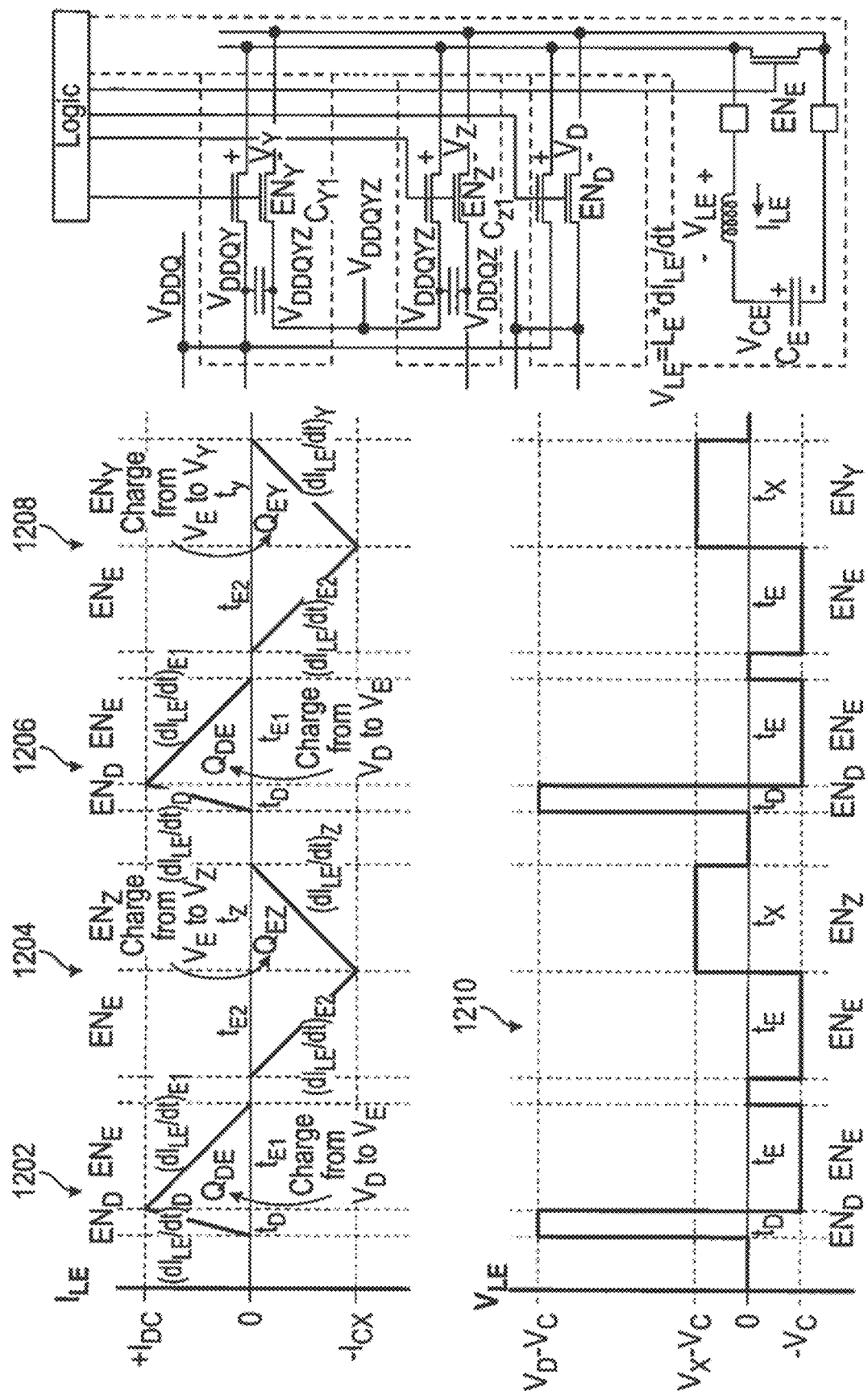
FIG. 12 illustrates voltages and currents for switched-inductor operation of the pseudo-differential signaling circuit of FIG. 11.

FIG. 12 illustrates voltages and currents for switched-inductor operation of the pseudo-differential signaling circuit of FIG. 11. For inductor $L_E$, the graph of inductor current 1202 shows current $I_{DC}$ for a transfer of charge $Q_{DE}$ from $V_D$ to $V_E$. The graph of inductor current 1204 shows current $I_{DC}$ for a transfer of charge $Q_{EZ}$ from $V_E$ to $V_Z$. The graph of inductor current 1206 shows current $I_{DC}$ for a transfer of charge $Q_{DE}$ from $V_D$ to $V_E$. The graph of inductor current 1208 shows current $I_{DC}$ for a transfer of charge $Q_{EY}$ from $V_E$ to $V_Y$. Aligning with the above graphs of inductor current, the graph of inductor voltage $V_{LE}$ shows voltage across the inductor $L_E$ during the various charge transfers.

Figure 13:
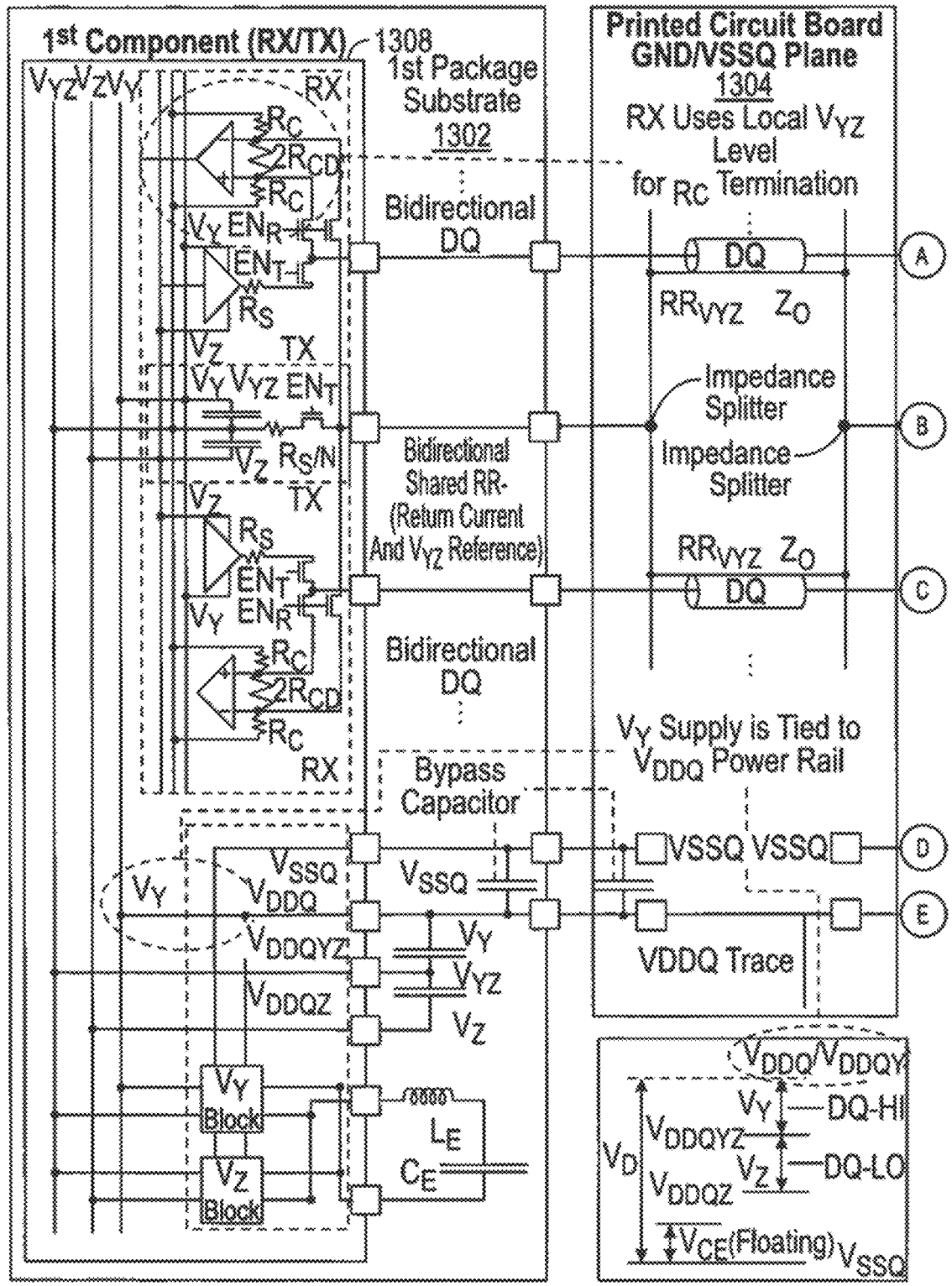
FIG. 13 illustrates a packaging embodiment for transmitters and receivers.
Figure 13:
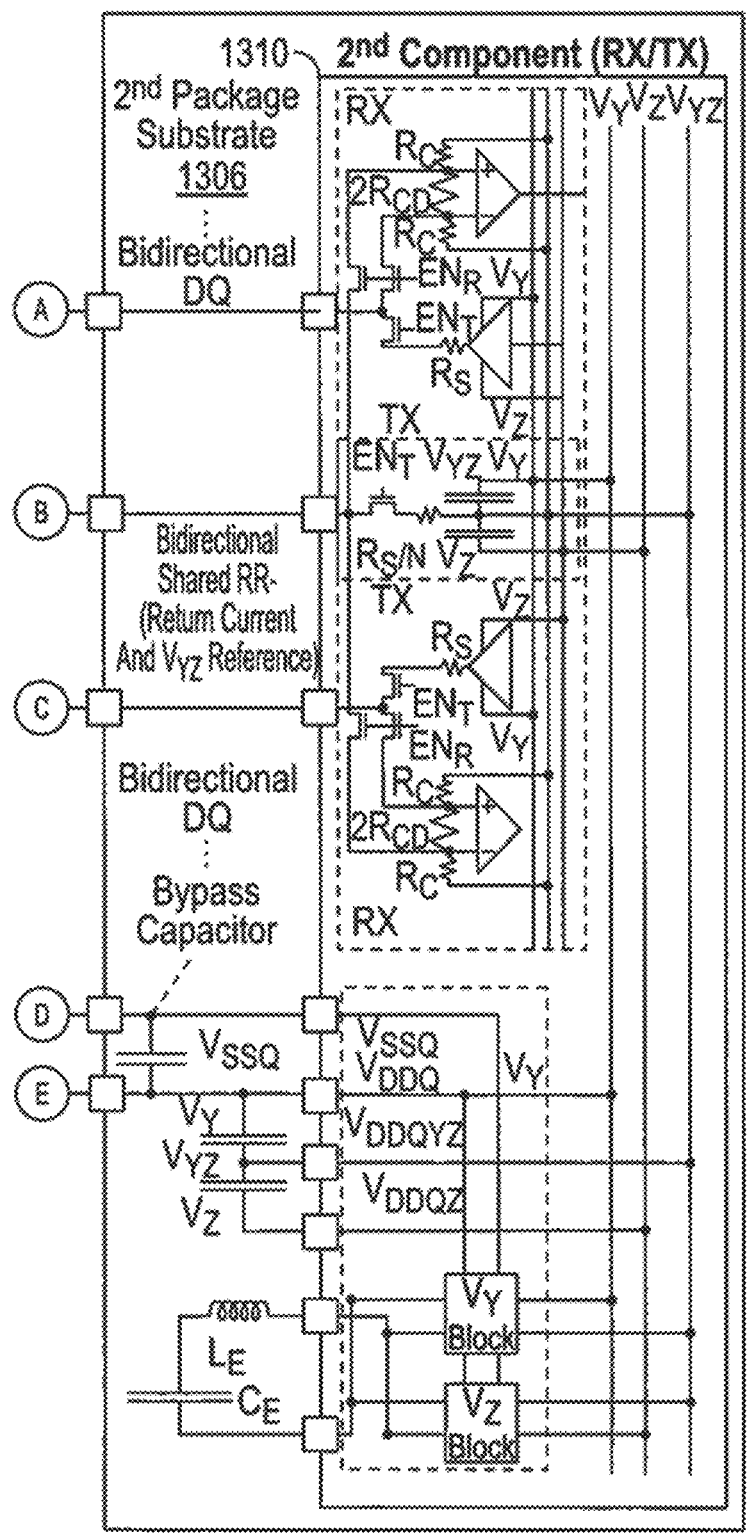

FIG. 13 illustrates a packaging embodiment for transmitters (TX) and receivers (Rx). Multiple transmitters and receivers in a first component 1308 (e.g., one or more integrated circuits) are mounted to a first package substrate 1302 (e.g., a single or multichip substrate or package). Further transmitters and receivers in a second component 1310 are mounted to a second package substrate 1306. In this embodiment, a transmitter and receiver pair is connected to a bidirectional data signal line DQ, and the bidirectional shared RR provides a return current and $V_{YZ}$ reference. A printed circuit board 1304 with a ground/VSSQ plane implements the signal transmission lines connecting the first package substrate 1302 to the second package substrate 1306, with $RR_{YYZ}$ providing the shielding for each signal line DQ.

Figure 14:
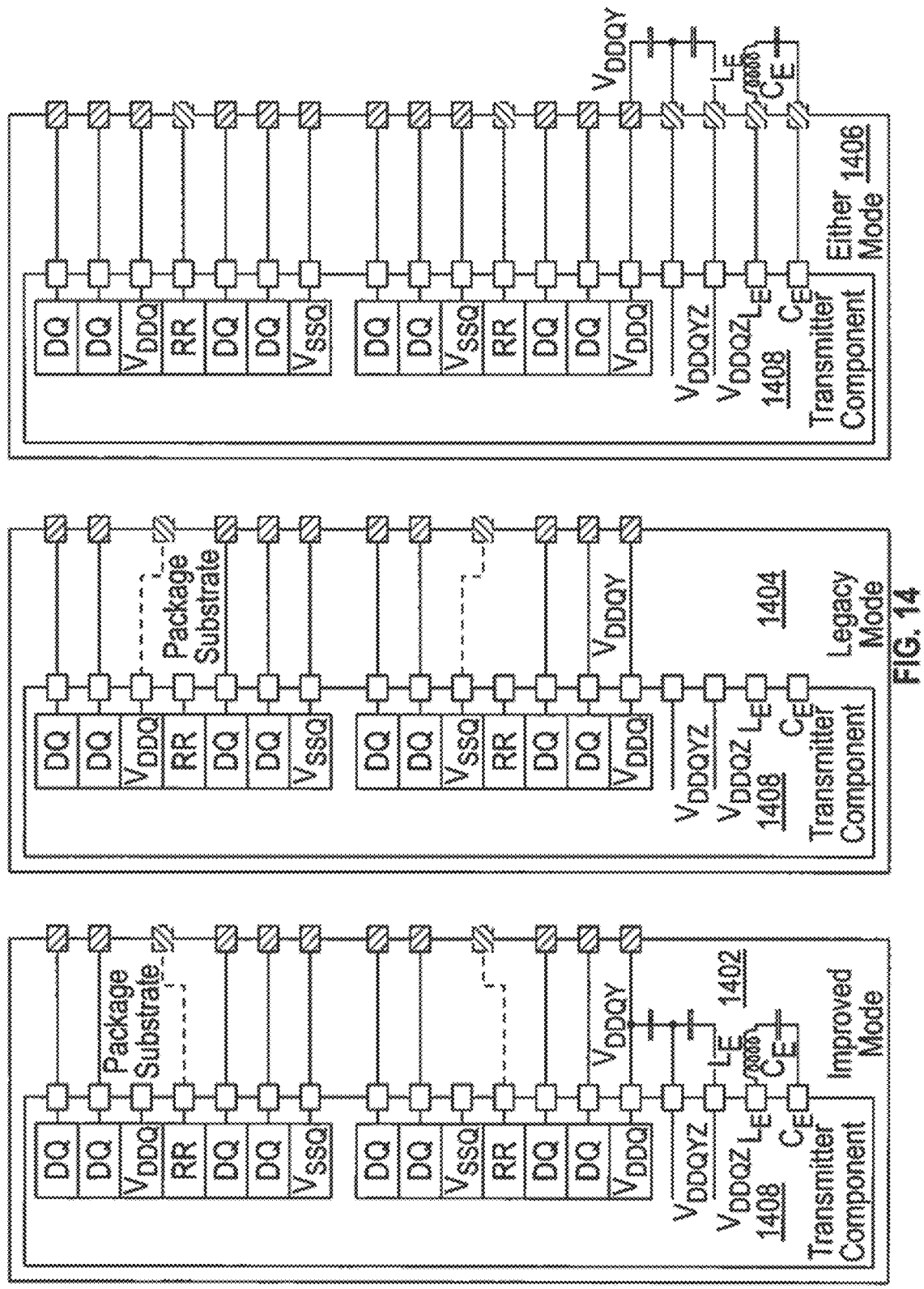
FIG. 14 illustrates packaging and external component options for the embodiment shown in FIG. 11.

FIG. 14 illustrates packaging and external component options for the embodiment shown in FIG. 11. This is a variation of the packaging and external component options shown in FIG. 6. For an improved mode, using mode 1 and pseudo-differential signaling, the package substrate 1402 mounts external inductor $L_E$ and external capacitor $C_E$ internal to the package and connects a subset of transmitter component 1408 pads to package pins. For legacy mode, using mode 0 and single-ended signaling, the package substrate 1404 does not mount any external inductors or capacitors, and connects a different subset of transmitter component 1408 pads to package pins. For either mode operation, using modes 0 and 1 (e.g. as selected by a user), the package substrate 1406 mounts external inductor $L_E$ and external capacitor $C_E$ external to the substrate 1406 and connects all of the transmitter component 1408 pads to package pins.

Figure 15:
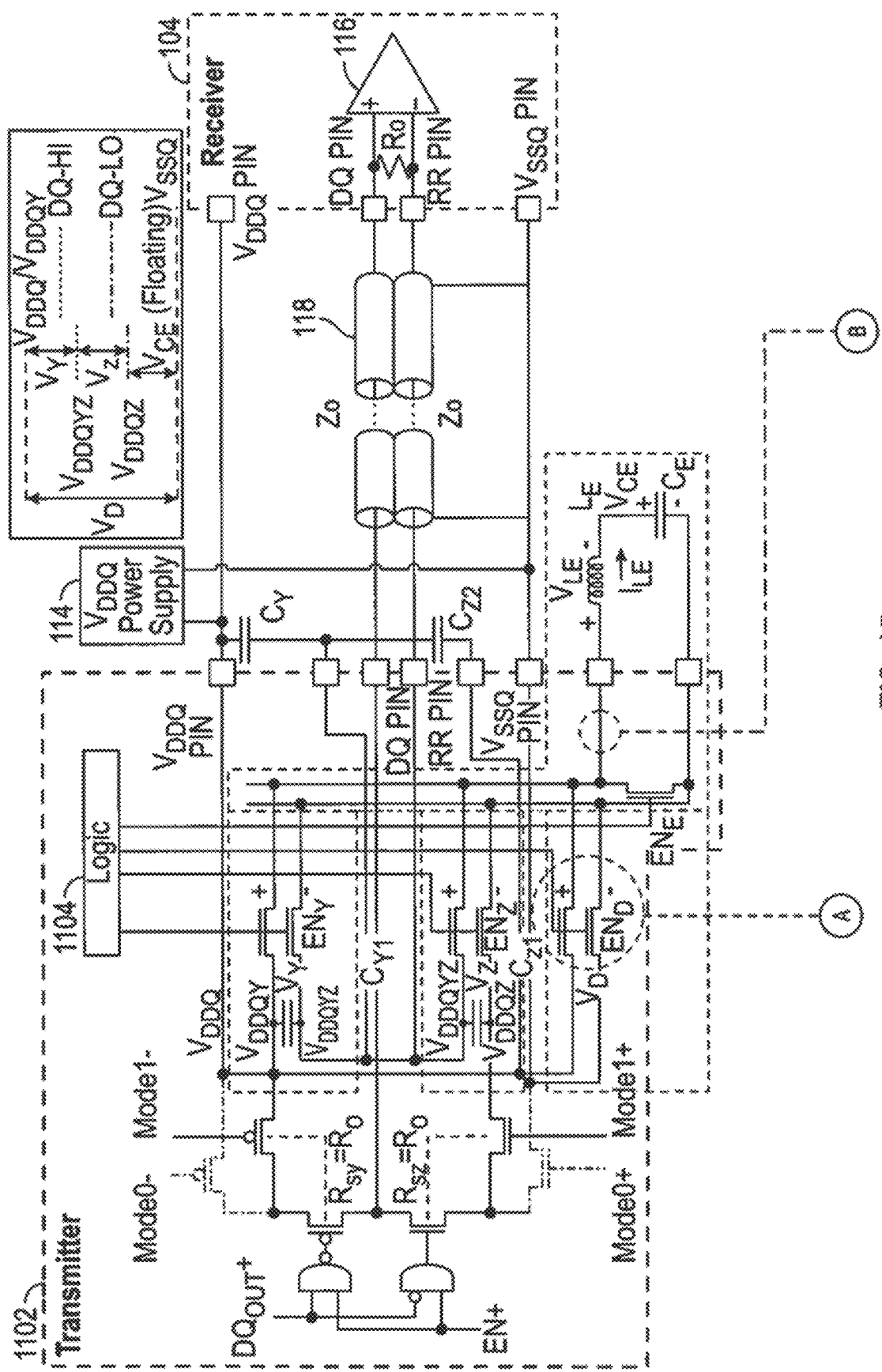
FIG. 15 illustrates design options for the embodiment shown in FIG. 11.
Figure 15:
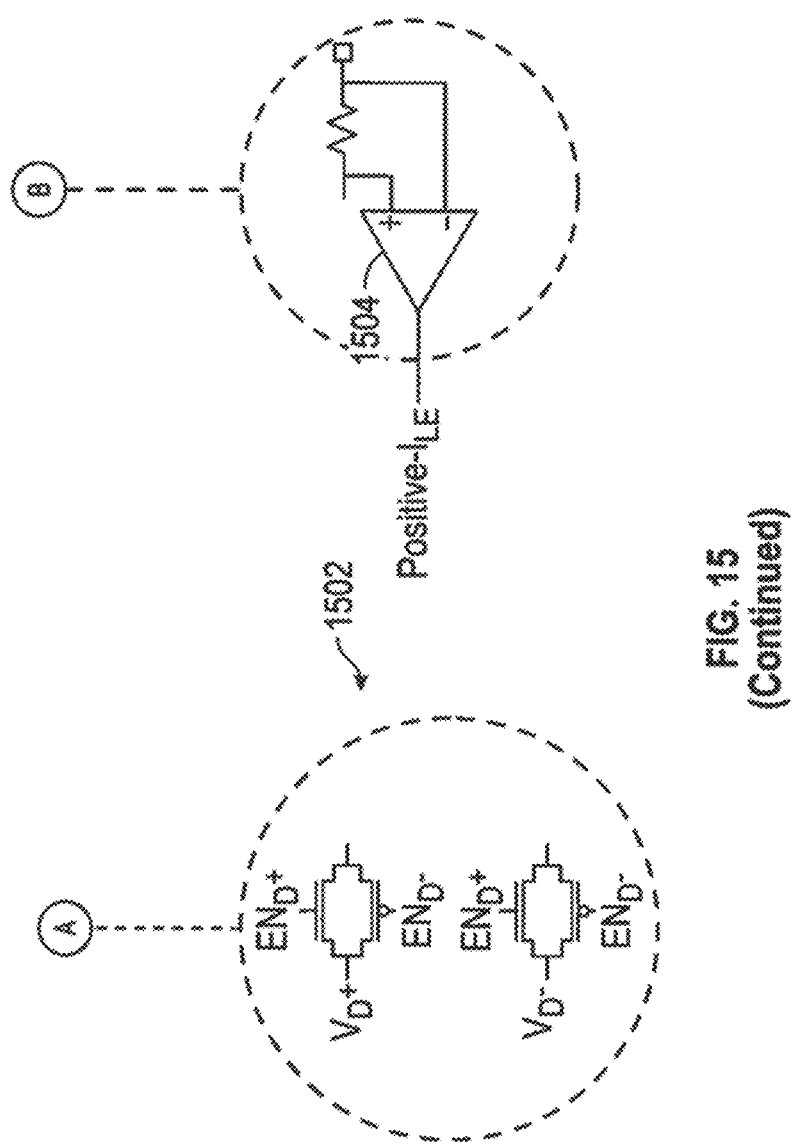

FIG. 15 illustrates design options for the embodiment shown in FIG. 11. These are variations of the options shown in FIGS. 9 and 10. Pass gates operated by switching logic 1104 in the transmitter 1102 can be implemented single-sided as shown in FIG. 11 or with double-sided pass gates 1502 (e.g., CMOS, with an NMOSFET and PMOSFET paired). Switching logic 1104 can also use the output of a comparator 1504 or differential amplifier connected across a resistor in line with the inductor $L_E$, to detect change in current direction or zero current in the inductor.

Figure 16:
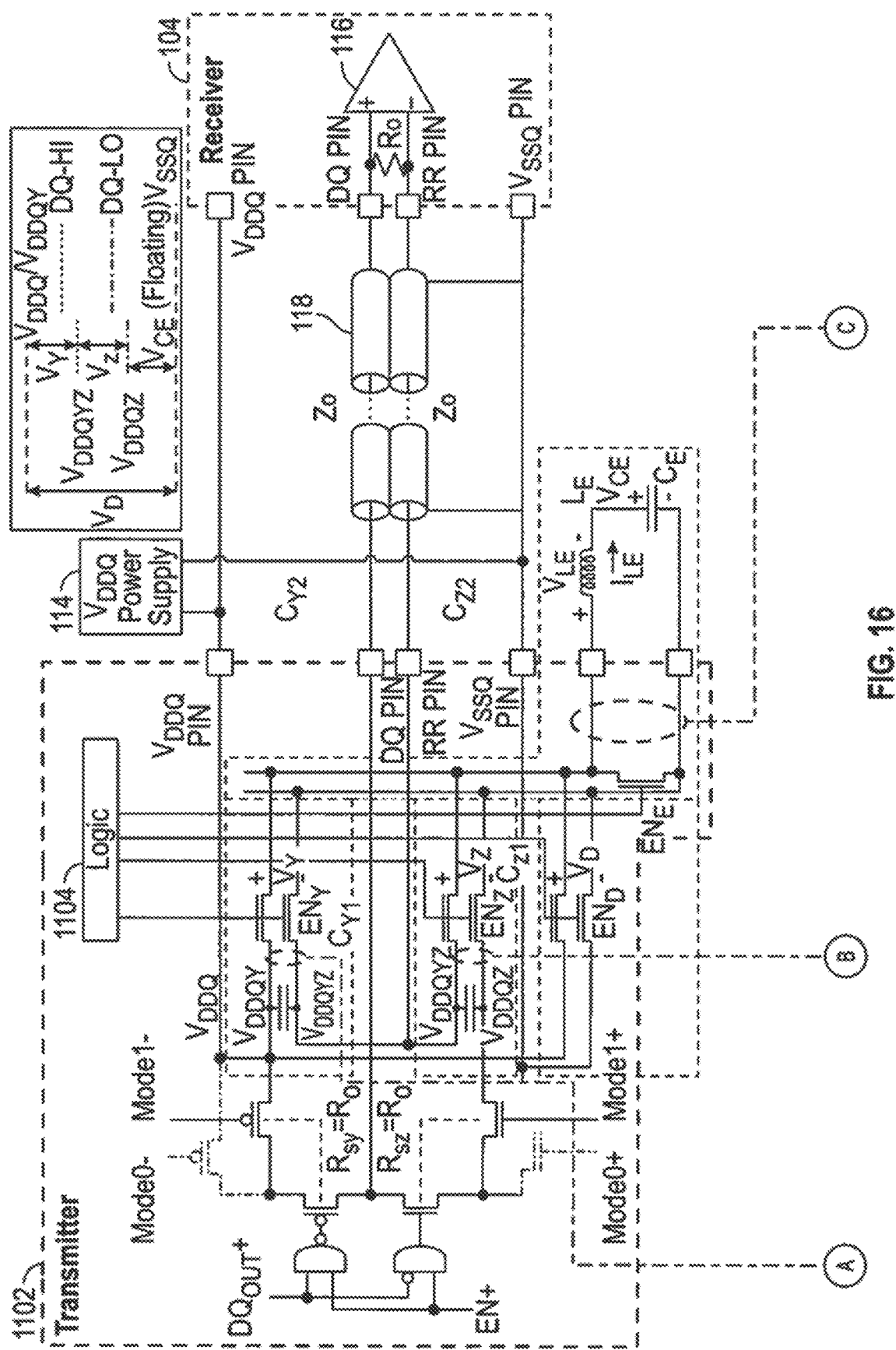
FIG. 16 illustrates further design options for the embodiment shown in FIG. 11.

FIG. 16 illustrates further design options for the embodiment shown in FIG. 11. Comparators 1602, 1604, 1606 monitor various voltage levels so that the switching logic 1104 can schedule charging cycles. Comparator 1602 monitors $V_{DDQY}$, or in a variation, monitors $V_{DDQYZ}$. Comparator 1604 monitors $V_{DDQZ}$. Comparator 1606 monitors voltage at one of the terminals of the inductor $L_E$, or in a variation monitors $V_{CE}$. In some versions, for measuring purposes, the measure enable signal is asserted when other enable control signals are deasserted. In variations, voltages across capacitors or across the inductor could be monitored. For example, comparators can provide an error signal to a duty cycle controller to regulate output voltages $V_{DDQY}$ and $V_{DDQZ}$, similarly to the embodiment depicted in FIG. 9.

Figure 17:
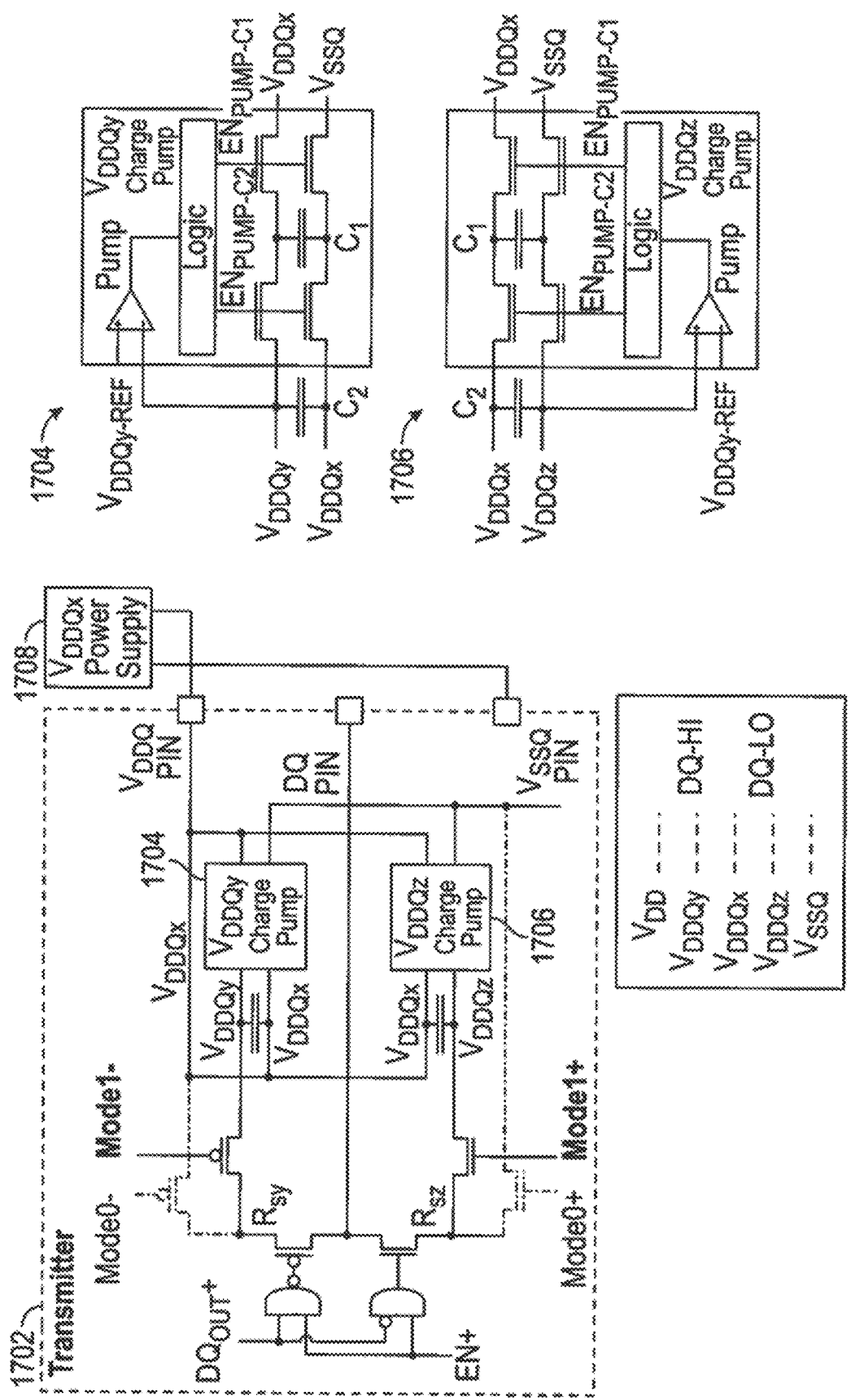
FIG. 17 illustrates a variation with charge pumps.

FIG. 17 illustrates a variation with charge pumps 1704, 1706. In this embodiment, the transmitter has mode 0 and mode 1, similar to previously described embodiments, but has internal voltages $V_{DDQy}$, $V_{DDQx}$, and $V_{DDQz}$ generated by charge pumps 1704, 1706 (another type of switched circuit, using switched capacitors) instead of switched inductor and capacitor circuits. In a further variation, these internal voltages could be generated by switched inductor and capacitor circuits, or by a combination of one or more charge pumps and one or more switched inductor and capacitor circuits, or other switched circuits, power supplies or voltage generators, etc.

In one embodiment, logic blocks monitor $V_{DDQy}$, $V_{DDQx}$ levels and enable pump cycles when reference values are met or exceeded. Nonoverlapping enable signals control the charge pumps 1704, 1706.

Figure 18:
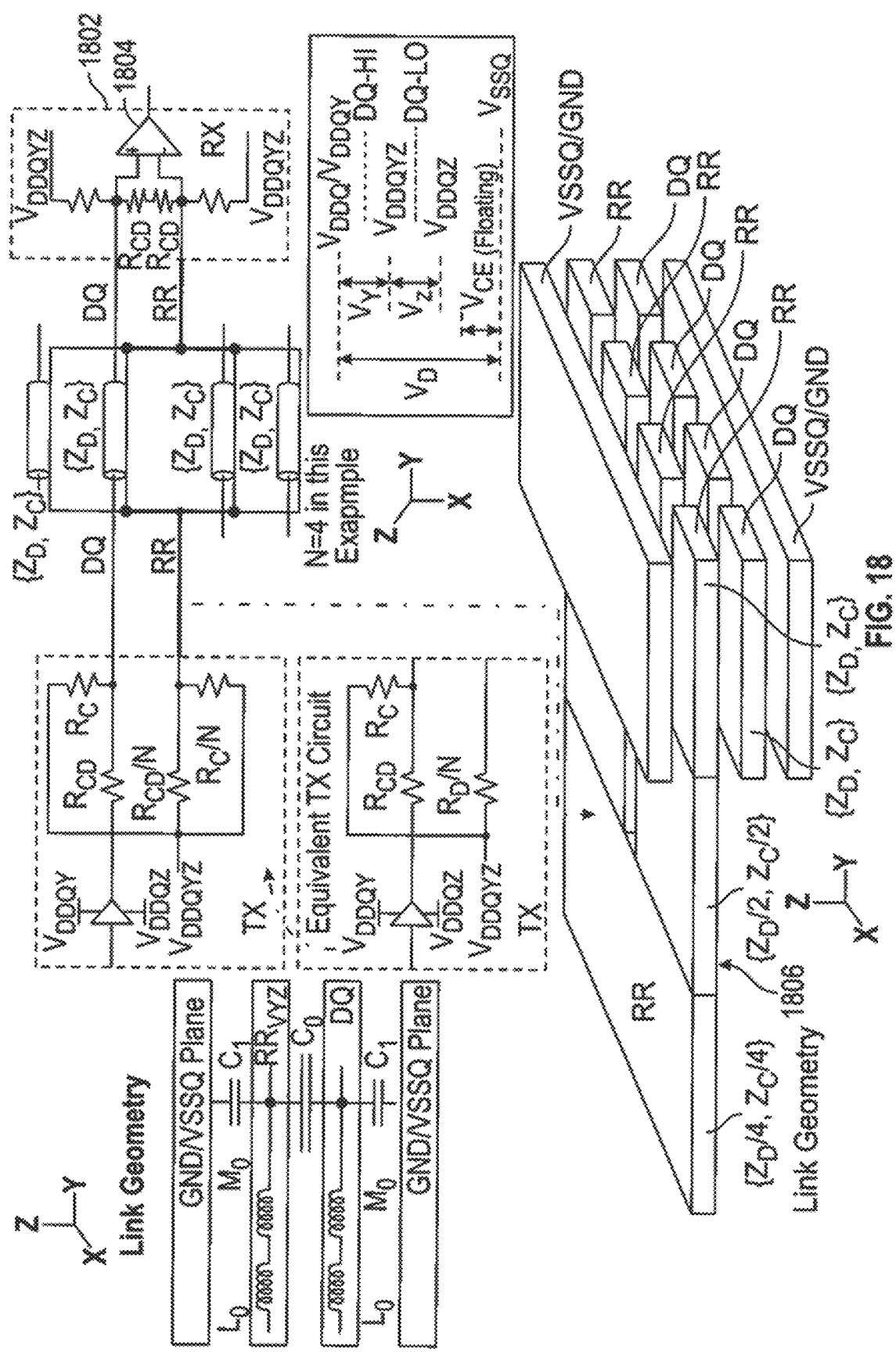
FIG. 18 illustrates a further embodiment of termination and link geometry details.

FIG. 18 illustrates a further embodiment of termination and link geometry details. The differential amplifier 1804 in the receiver 1802 has two termination resistors $R_{CD}$ in series across the differential inputs of the differential amplifier 1804, a termination resistor $R_C$ from the positive input of the differential amplifier 1804 to the voltage supply $V_{DDQYZ}$, and a termination resistor $R_C$ from the negative input of the differential amplifier 1804 to the voltage supply $V_{DDQYZ}$. The link geometry 1806 has an impedance splitter from a common region into two regions, and a further link splitter from each of the two regions to two further regions, for the RR signal line. After the second impedance split, each of the RR signal lines is paired with a DQ signal line, and the pair of RR and DQ signal lines is sandwiched between VSSQ/ground planes.

Figure 19:
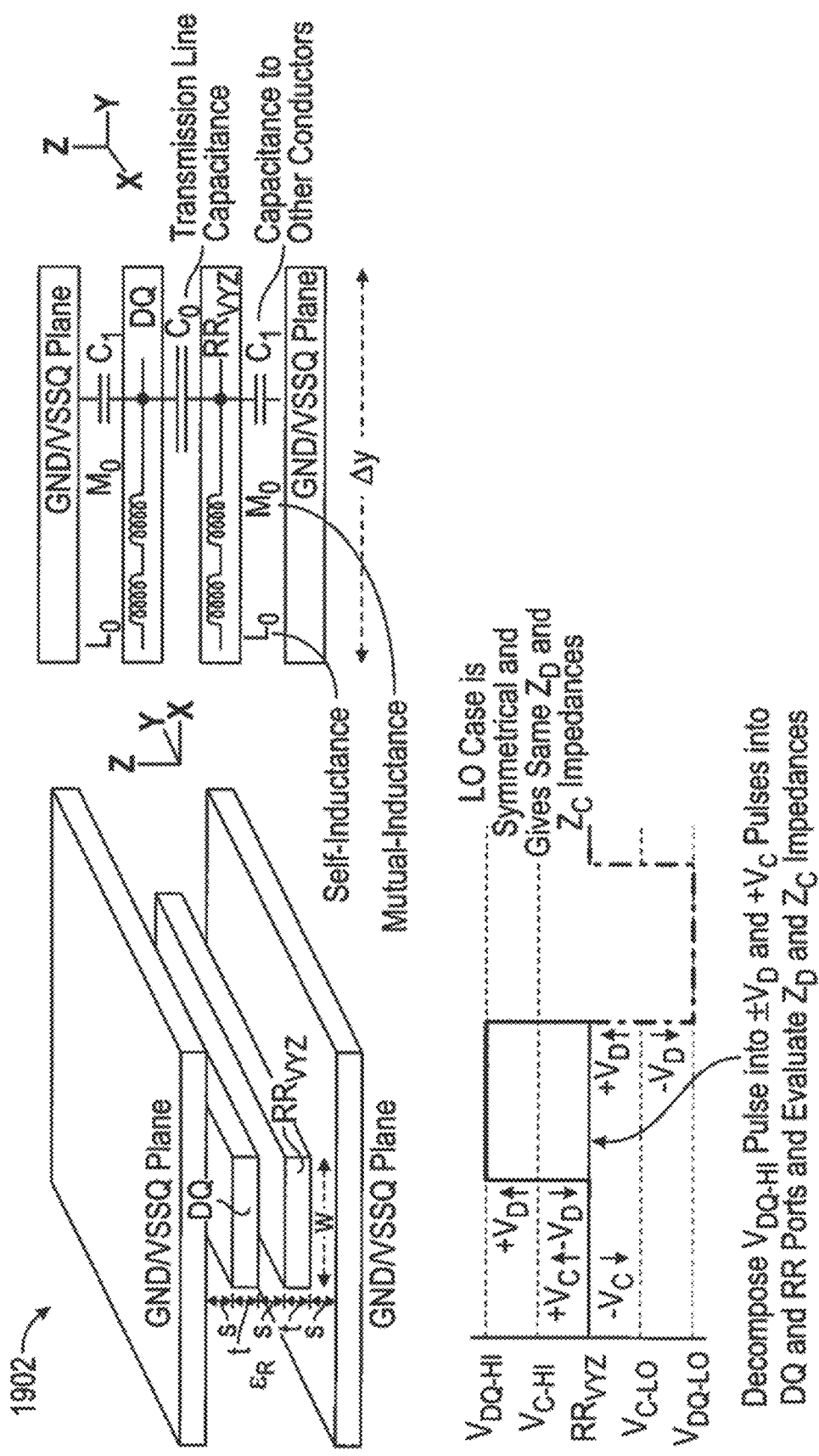
FIG. 19 illustrates impedance and termination details.

FIG. 19 illustrates impedance and termination details. The differential amplifier 1904 in the receiver 1906 has two termination resistors $R_{CD}$ in series across the differential inputs of the differential amplifier 1904, a termination resistor $R_C$ from the positive input of the differential amplifier 1904 to the voltage supply VYZ, and a termination resistor from the negative input of the differential amplifier 1904 to the voltage supply VYZ, which is connected to the $V_{DDQ}$ supply voltage. In the stacked layers 1902, for example in a printed circuit board, a DQ signal line is paired with an $RR_{YZ}$ signal line, and these are sandwiched by ground/VSSQ planes. FIG. 19 shows differential impedance, an impedance example, and a termination example.

Figure 20:
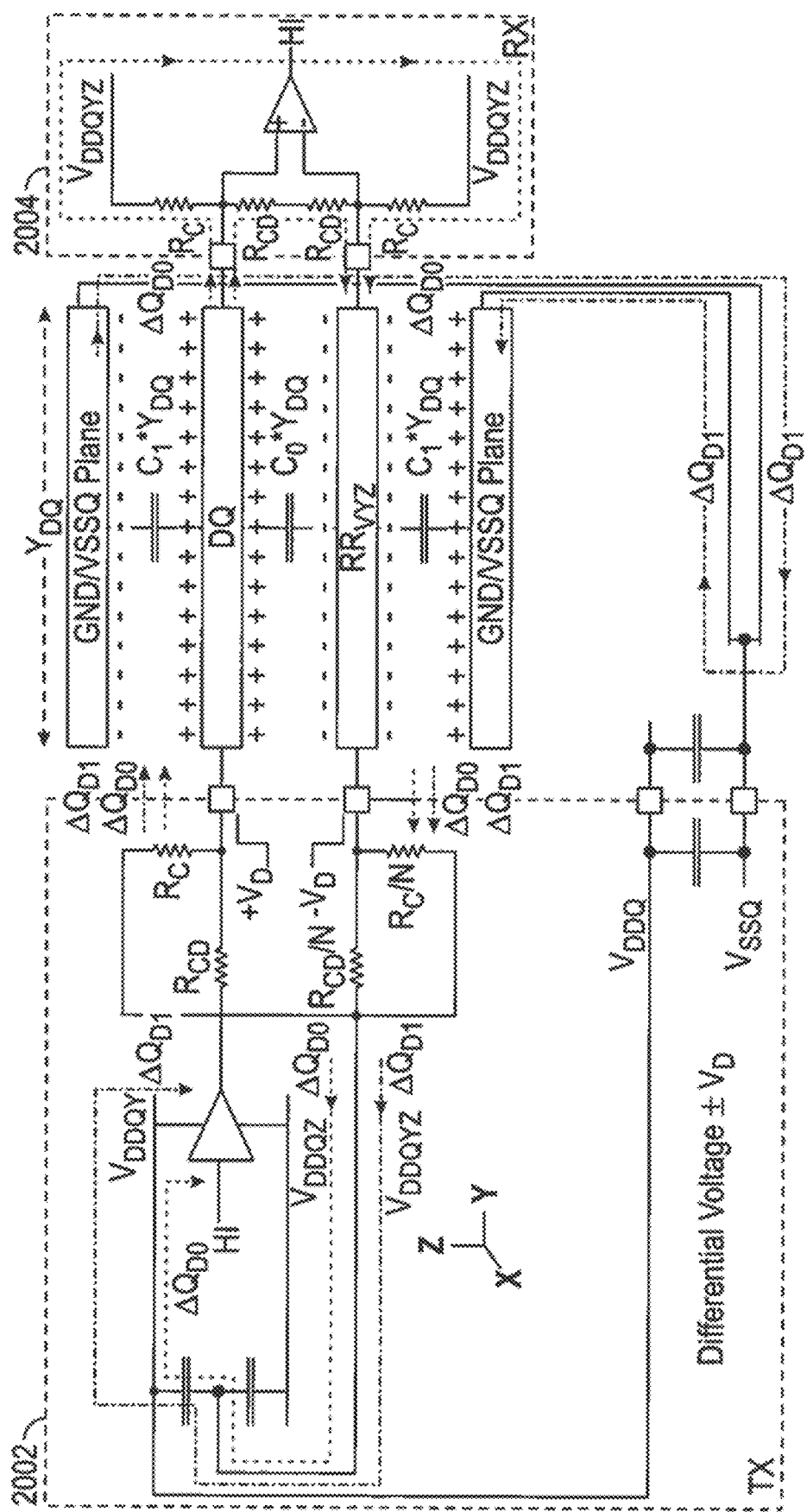
FIG. 20 illustrates differential and common-mode charge flow for a high bit.
Figure 20:
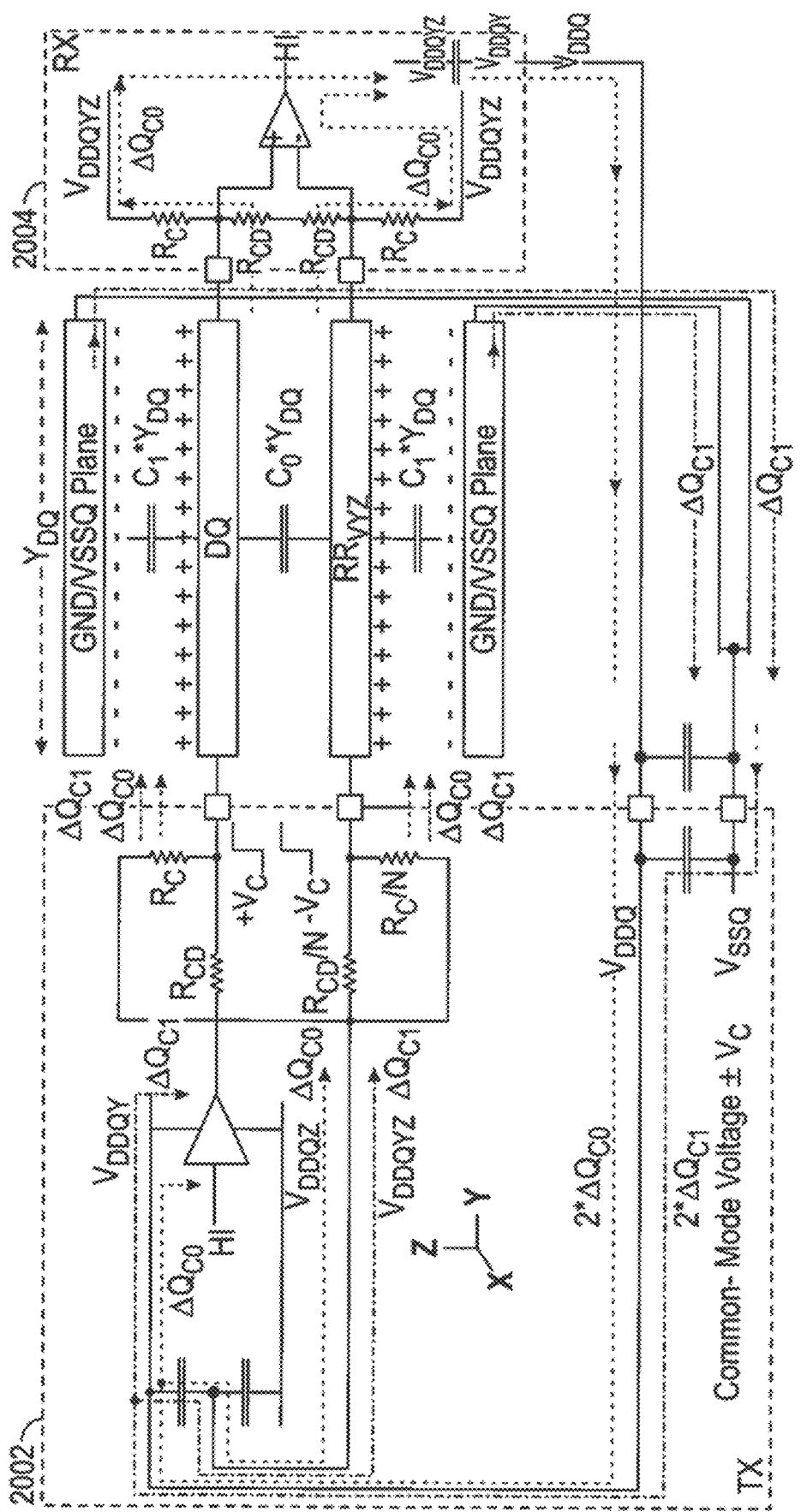

FIG. 20 illustrates differential and common-mode charge flow for a high bit. In the upper half of FIG. 20, a differential voltage $\pm V_D$ for a high bit is driven by the transmitter 2002 onto the DQ and $RR_{YZ}$ signal lines, and received at the receiver 2004, with charge flow as illustrated. In the lower half of FIG. 20, a common mode voltage $+V_C$ is driven by the transmitter 2002 onto the DQ and $RR_{YZ}$ signal lines, and received at the receiver 2004, with charge flow as illustrated.

Figure 21:
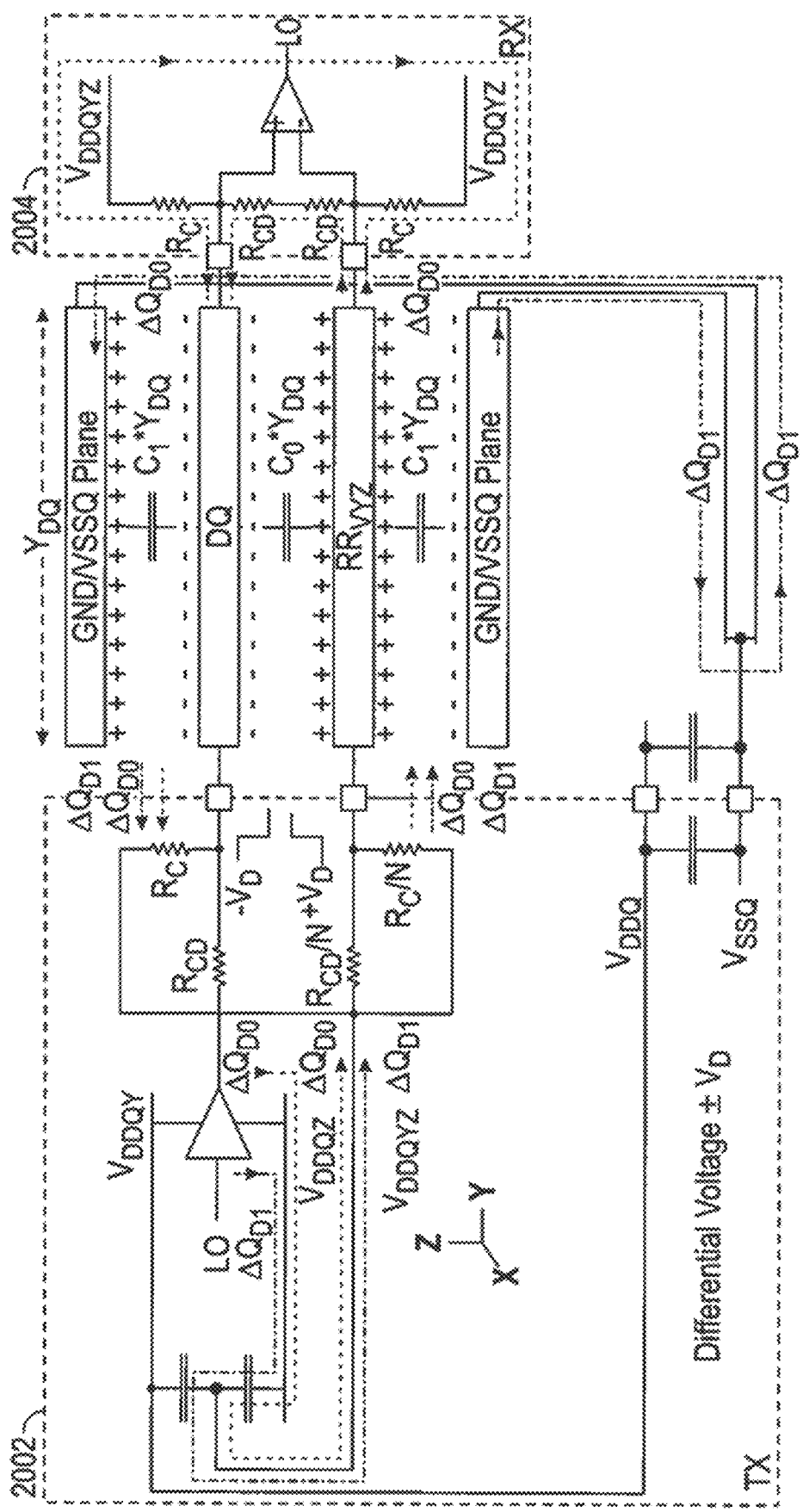
FIG. 21 illustrates differential and common-mode charge flow for a low bit.
Figure 21:
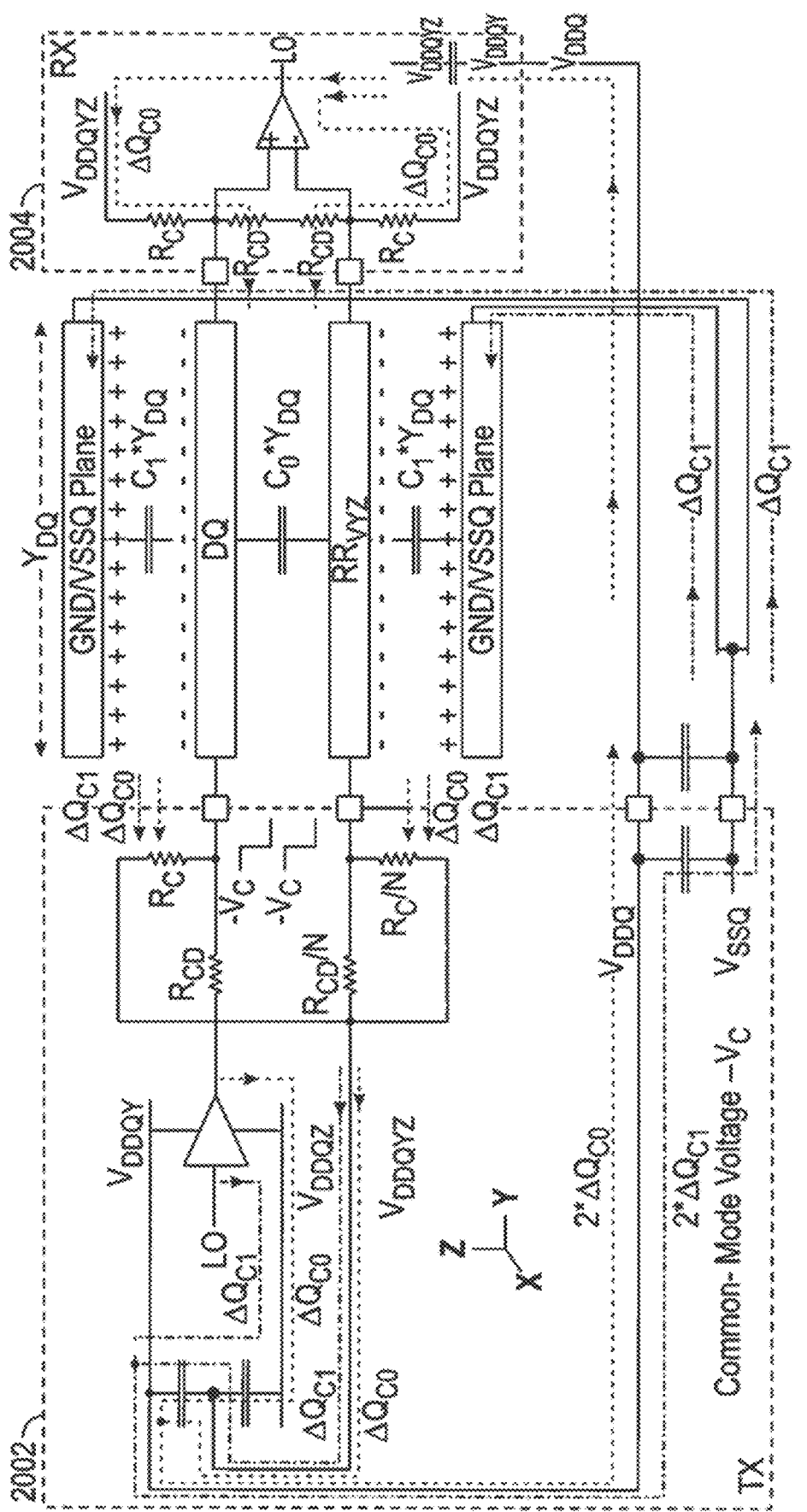

FIG. 21 illustrates differential and common-mode charge flow for a low bit. In the upper half of FIG. 21, a differential voltage $\pm V_D$ for a low bit is driven by the transmitter 2002 onto the DQ and $RR_{YZ}$ signal lines, and received at the receiver 2004, with charge flow as illustrated. In the lower half of the FIG. 21, a common mode voltage $-V_C$ is driven by the transmitter 2002 onto the DQ and $RR_{YZ}$ signal lines, and received at the receiver 2004, with charge flow as illustrated.

Figure 22:
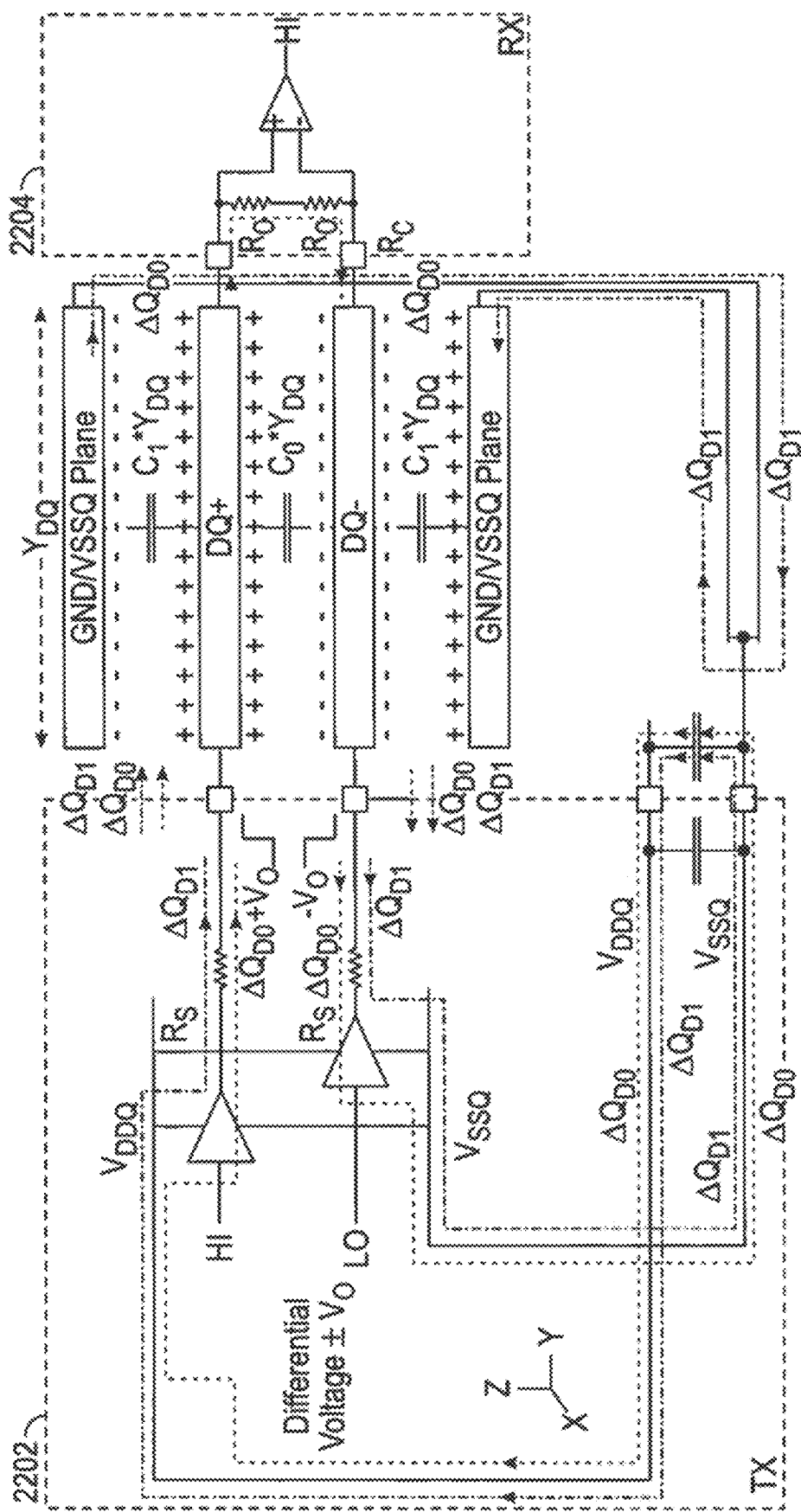
FIG. 22 illustrates signaling charge-flow for a high/low bit and for a low/high bit.
Figure 22:
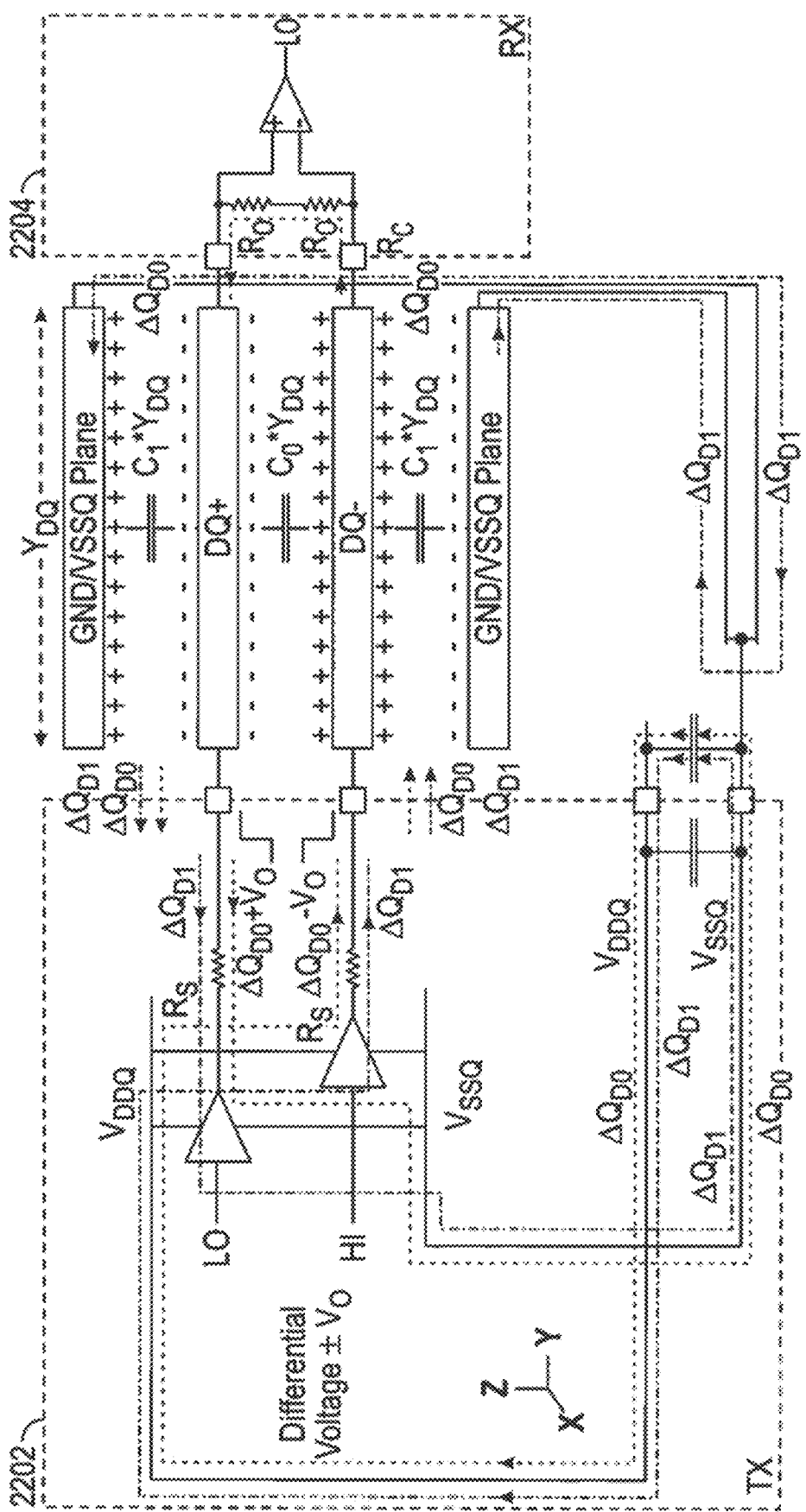

FIG. 22 illustrates signaling charge-flow for bit transitions, e.g., a high/low bit transition and for a low/high bit transition. In the upper half of FIG. 22, a differential voltage $\pm V_O$ for a high/low bit is driven by the transmitter 2202 onto the DQ+ and DQ− signal lines, and received at the receiver 2204, with charge flow as illustrated. In the lower half of FIG. 21, a differential voltage $\pm V_O$ for a low/high bit is driven by the transmitter 2202 onto the DQ+ and DQ− signal lines, and received at the receiver 2204, with charge flow as illustrated.

Figure 23:
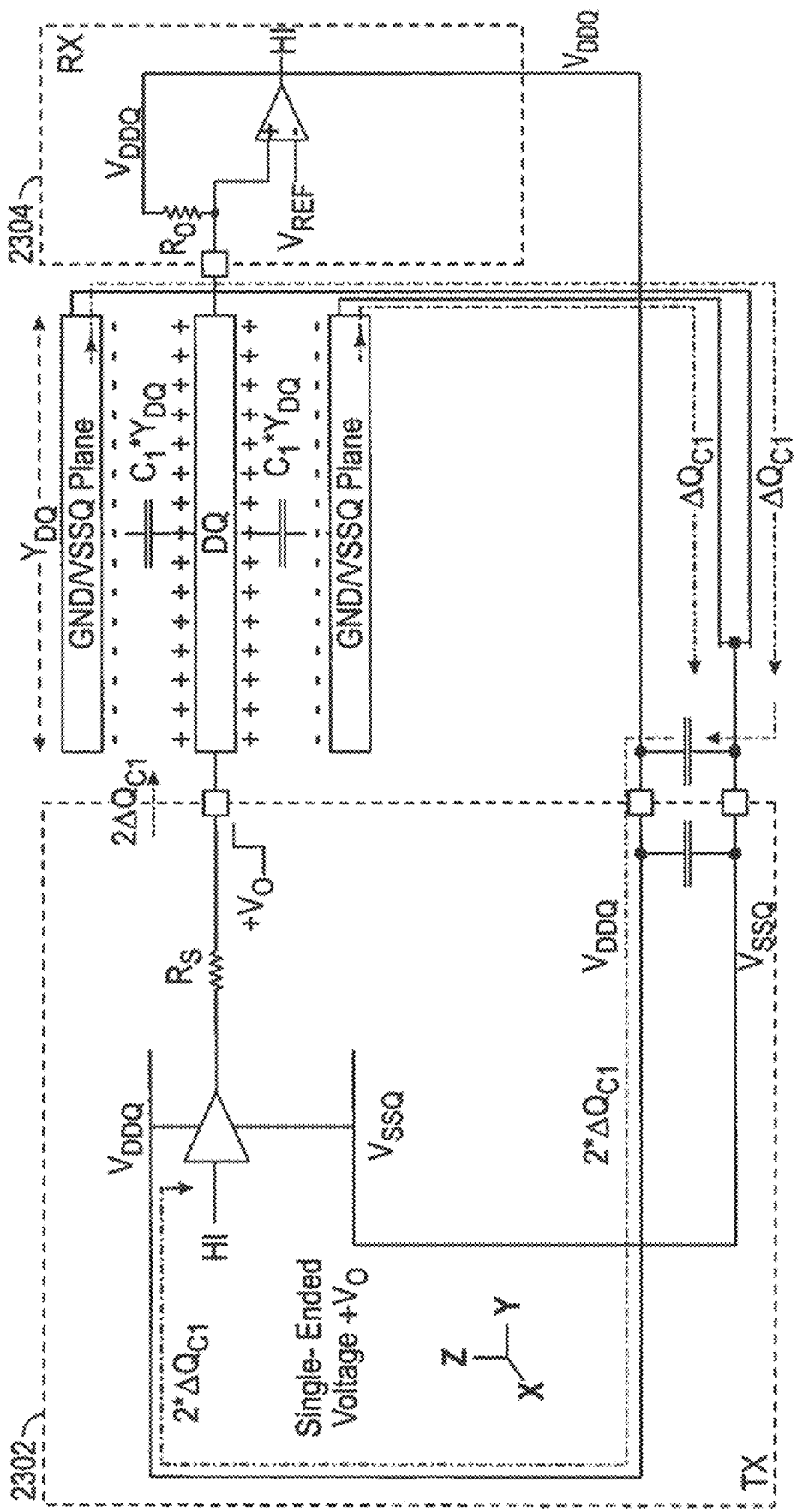
FIG. 23 illustrates single-ended signaling charge-flow for a high bit and a low bit.
Figure 23:
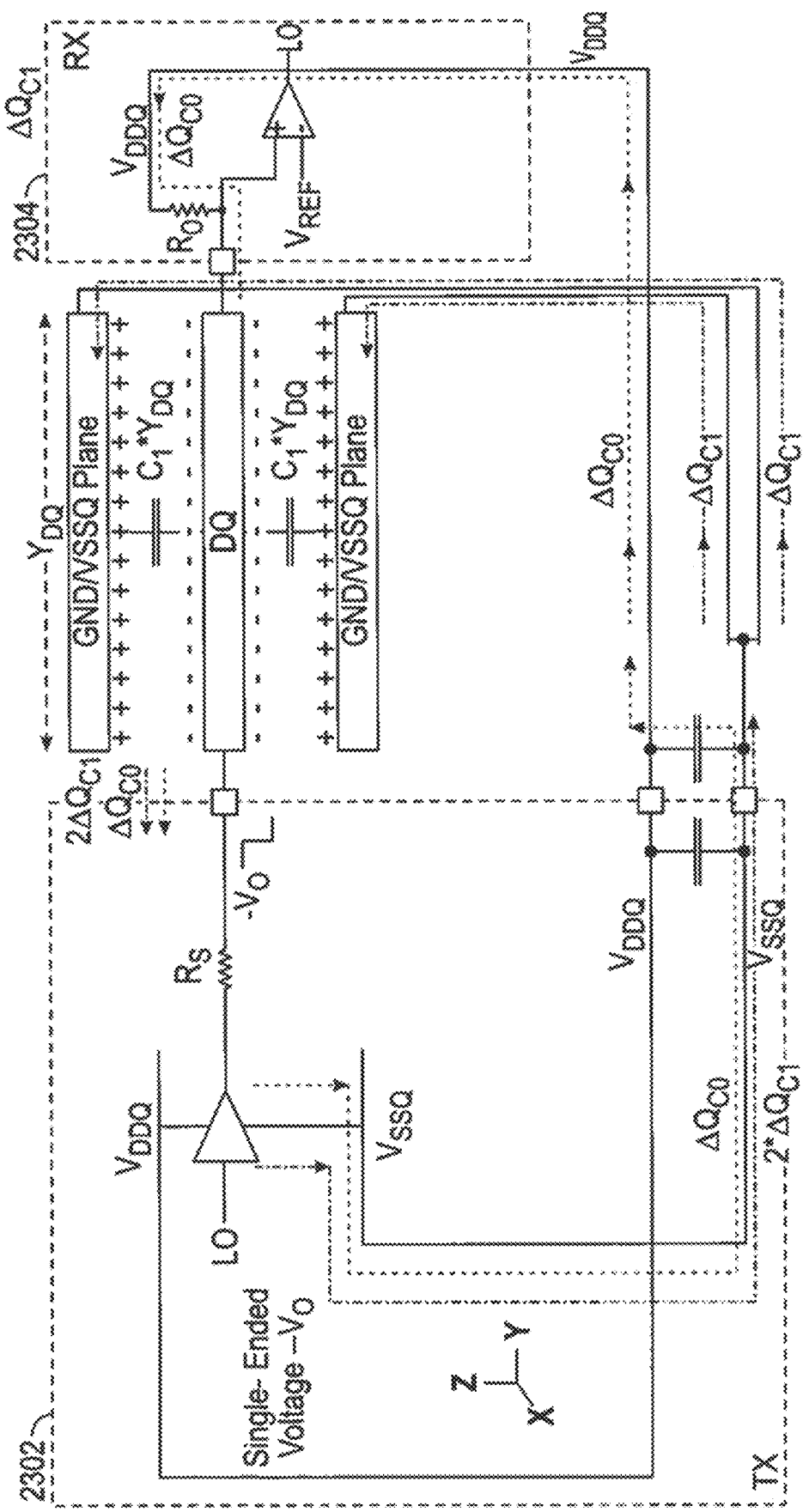

FIG. 23 illustrates single-ended signaling charge-flow for a high bit and a low bit. In the upper half of FIG. 23, a single-ended voltage $+V_O$ for a high bit is driven by the transmitter 2302 onto the DQ signal line, and received at the receiver 2304, with charge flow as illustrated. In the lower half of FIG. 23, a single-ended voltage $-V_O$ for a low bit is driven by the transmitter 2302 onto the DQ signal line, and received at the receiver 2204, with charge flow as illustrated.

Figure 24:
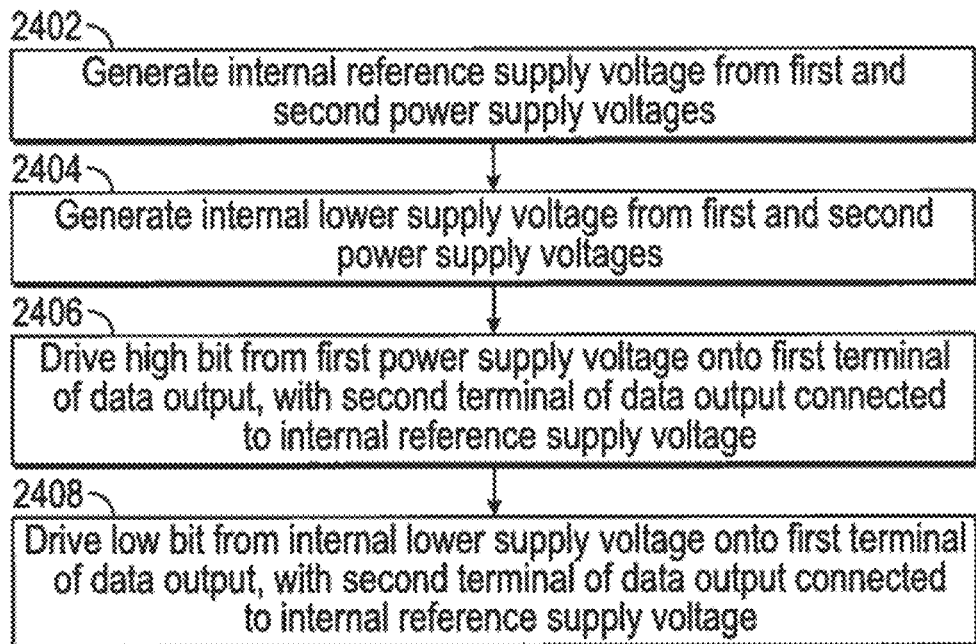
FIG. 24 is a flow diagram of a method of data signaling, practiced by a data signaling circuit.

FIG. 24 is a flow diagram of a method of data signaling, practiced by a data signaling circuit. Embodiments of transmitters and receivers in FIGS. 1-23, and variations thereof, can practice this method.

In an action 2402, an internal reference supply voltage is generated from first and second power supply voltages.

In an action 2404, an internal lower supply voltage is generated from the first and second power supply voltages. A switching circuit with switched inductor(s), capacitor(s) and pass gates, or a charge pump circuit switched capacitor(s) and pass gates could generate these internal voltages.

In an action 2406, a high bit is driven from the first power supply voltage onto the first terminal of a data output, with a second terminal of the data output connected to the internal reference supply voltage.

In an action 2408, a low bit is driven from the internal lower supply voltage onto the first terminal of the data output, with the second terminal of the data output connected to the internal reference supply voltage.

Figure 25:
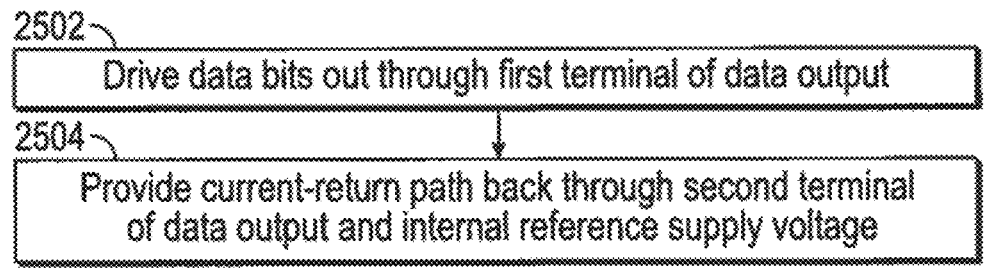
FIG. 25 is a flow diagram of a further method of data signaling.

FIG. 25 is a flow diagram of a further method of data signaling. In an action 2502, data bits are driven out through a first terminal of the data output.

In an action 2504, a current-return path is provided back through a second terminal of the data output and the internal reference supply voltage.

Figure 26:
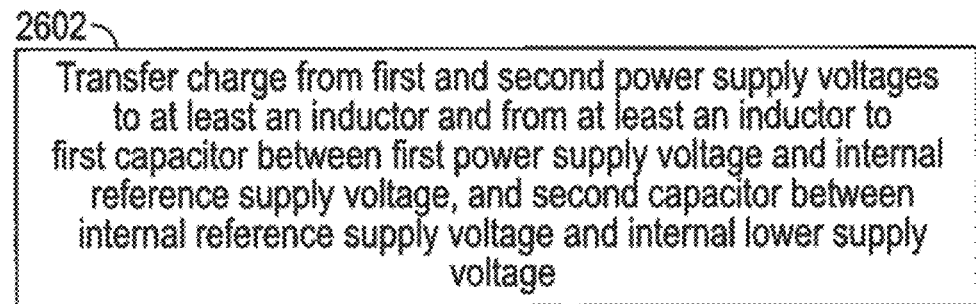
FIG. 26 is a flow diagram of a method of generating a voltage.

FIG. 26 is a flow diagram of a method of generating a voltage. The method is practiced by a switching circuit.

In an action 2602, charge is transferred from first and second power supply voltages to an inductor, an inductor in series with a capacitor, or multiple inductors, etc., i.e., at least an inductor, and from the at least an inductor to a first capacitor between the first power supply voltage and an internal reference supply voltage, and a second capacitor between the internal reference supply voltage and an internal lower supply voltage.

Figure 27:
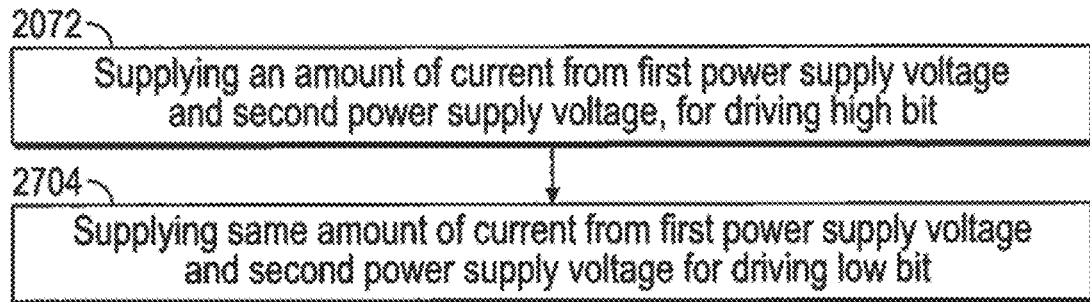
FIG. 27 is a flow diagram of a further method of data signaling.

FIG. 27 is a flow diagram of a further method of data signaling. In an action 2702, an amount of current is supplied from the first power supply voltage and the second power supply voltage, for driving a high bit.

In an action 2704, the same amount of current is supplied from the first power supply voltage and the second power supply voltage, for driving a low bit.

Figure 28:
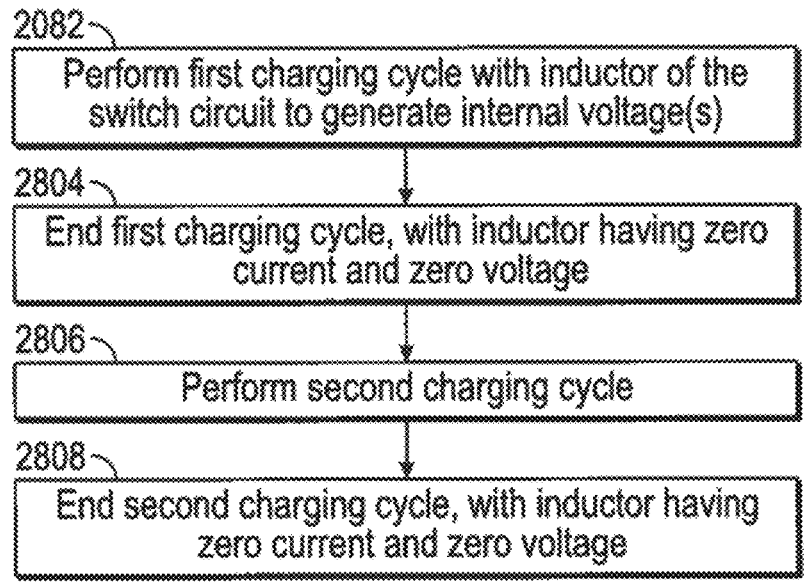
FIG. 28 is a flow diagram of a method of operating a switching circuit.

FIG. 28 is a flow diagram of a method of operating a switching circuit. In various embodiments described herein, and variations thereof, the switching circuit has an inductor and one or more capacitors, and generates one or more internal voltages.

In an action 2802, a first charging cycle is performed with the inductor of the switch circuit, to generate one or more internal voltages.

In an action 2804, the first charging cycle is ended, with the inductor having zero current and zero voltage. This may be referred to as "parking" the inductor.

In an action 2806, a second charging cycle is performed. This may be to generate the same internal voltage, or another, differing internal voltage.

In an action 2808, the second charging cycle is ended, with the inductor having zero current and zero voltage.

Figure 29:
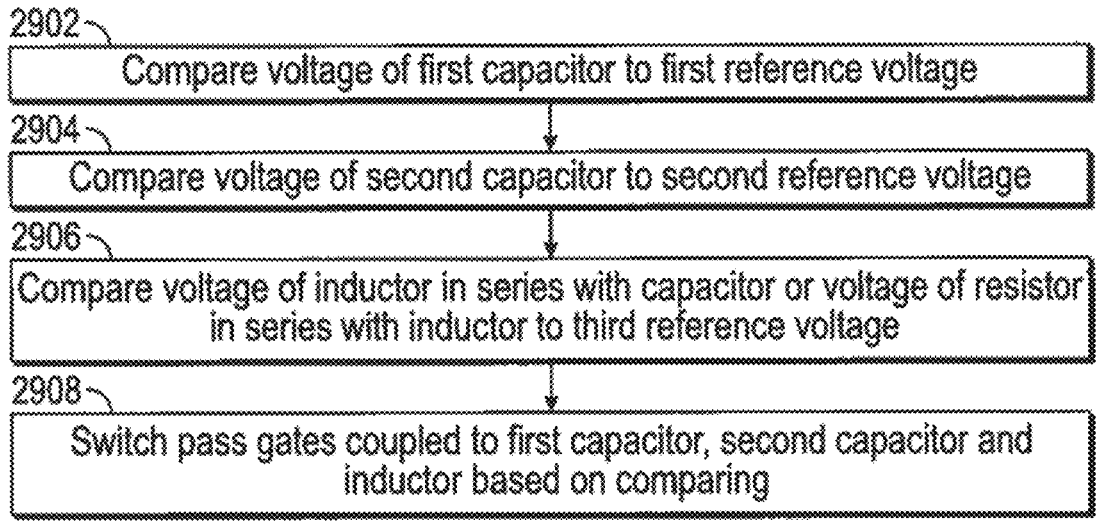
FIG. 29 is a flow diagram of a further method of generating a voltage.

FIG. 29 is a flow diagram of a further method of generating a voltage. The method is practiced by a switching circuit with an inductor, capacitors, and monitoring circuitry for monitoring voltages, for example comparators or differential amplifiers.

In an action 2902, a voltage of a first capacitor is compared to a first reference voltage.

In an action 2904, a voltage of a second capacitor is compared to a second reference voltage.

In an action 2906, a voltage of an inductor in series with a capacitor, or a voltage of a resistor in series with the inductor, is compared to a third reference voltage. Further variations of the action 2906 are readily devised for other circuit configurations involving inductors.

In an action 2908, pass gates coupled to the first capacitor, second capacitor and the inductor are switched, based on the comparing in the actions 2902, 2904 and 2906.

Figure 30:
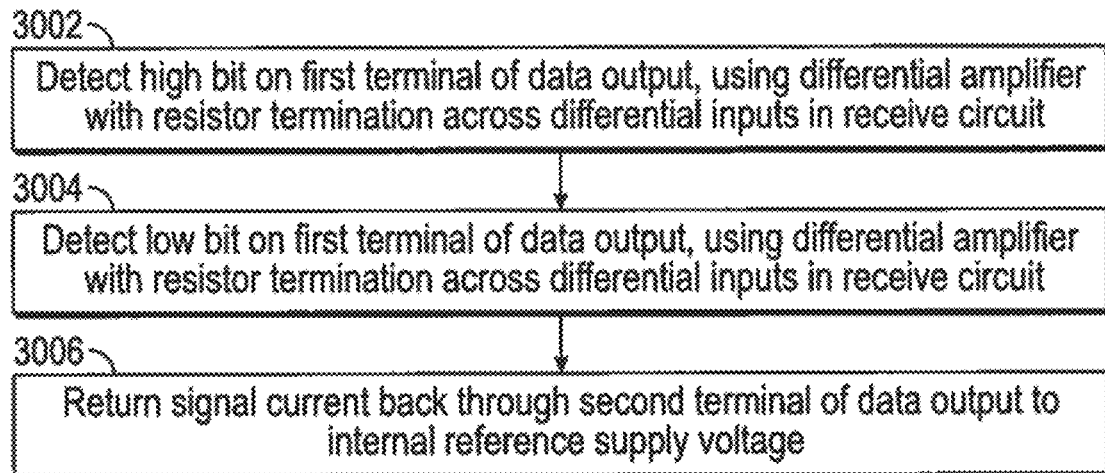
FIG. 30 is a flow diagram of a further method of data signaling.

FIG. 30 is a flow diagram of a further method of data signaling. The method is practiced by embodiments of a receiver described herein, and variations thereof.

In an action 3002, a high bit on the first terminal of a data output is detected in the receive circuit, using a differential amplifier with resistor termination across differential inputs.

In an action 3004, a low bit on the first terminal of the data output is detected in the receive circuit, using the differential amplifier with the resistor termination across differential inputs.

In an action 3006, signal current is returned back through the second terminal of the data output to the internal reference supply voltage.

Figure 31:
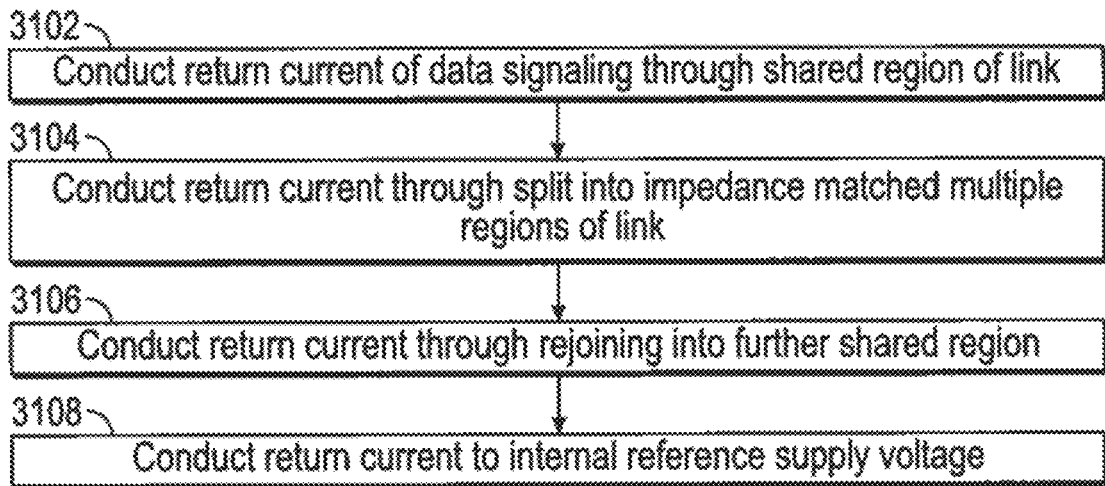
FIG. 31 is a flow diagram of a further method of data signaling.

FIG. 31 is a flow diagram of a further method of data signaling. The method is practiced using a link geometry, and internal reference supply voltage generation, such as described herein.

In an action 3102, return current of data signaling is conducted through a shared region of the link. The link is, for example, connecting a transmitter and receiver, or a pair of transceivers.

In an action 3104, the return current is conducted through a split into impedance matched multiple regions of the link. In some versions, there are multiple splits.

In an action 3106, the return current is conducted through a rejoining into a further shared region. There could be multiple rejoinings if there are multiple splits. Some versions are symmetric in geometry.

In an action 3108, the return current is conducted to the internal reference supply voltage.

Figure 32:
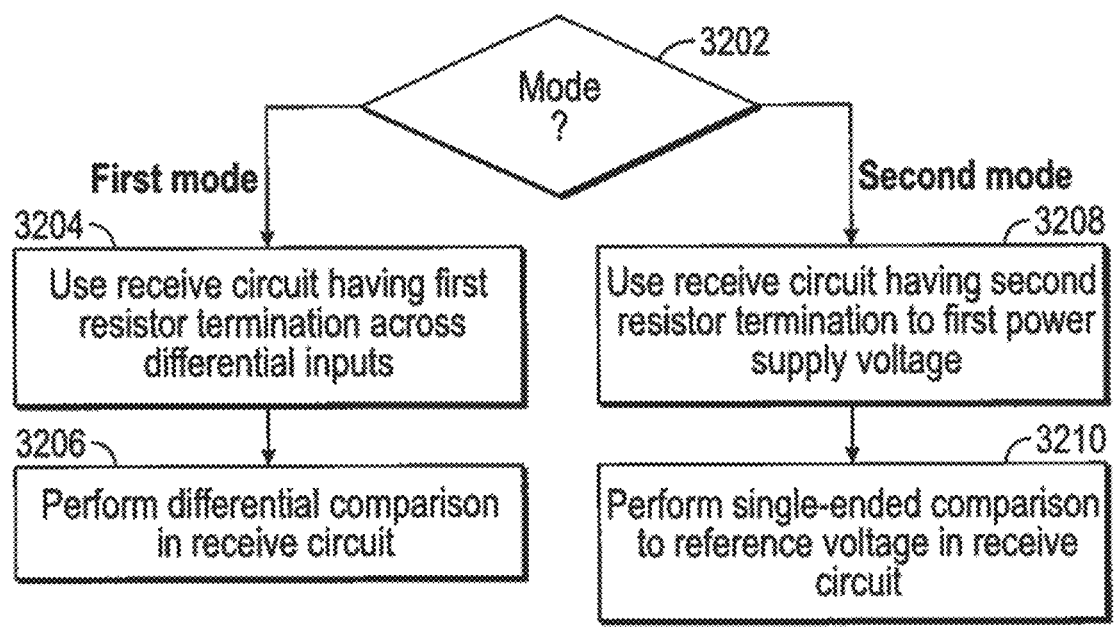
FIG. 32 is a flow diagram of a further method of data signaling.

FIG. 32 is a flow diagram of a further method of data signaling. The method is practiced by data signaling circuits, with two modes of operation as described herein.

In a decision action 3202, it is determined in which mode the circuit is operating, a first mode (e.g., pseudo-differential signaling) or a second mode (e.g., legacy mode with single-ended signaling).

If the circuit is in the first mode, flow branches to the action 3204. In the action 3204, a receive circuit having first resistor termination across differential inputs is used. In an action 3206, differential comparison is performed in the receive circuit.

If the circuit is in the second mode, flow branches to the action 3208. In the action 3208, a receive circuit having a second resistor termination to the first power supply voltage is used. In an action 3210, single-ended comparison to a reference voltage is performed in the receive circuit.

The above description of illustrated embodiments of the disclosure, including what is described in the Abstract, is not intended to be exhaustive or to limit the disclosure to the precise forms disclosed. While specific embodiments of, and examples for, the disclosure are described herein for illustrative purposes, various equivalent modifications are possible within the scope of the disclosure, as those skilled in the relevant art will recognize. Other embodiments may have layers in different orders, additional layers or fewer layers than the illustrated embodiments.

Various operations are described as multiple discrete operations, in turn, in a manner that is most helpful in understanding the present disclosure, however, the order of description should not be construed to imply that these operations are necessarily order dependent. In particular, these operations need not be performed in the order of presentation.

The terms "over," "above" "under," "between," and "on" as used herein refer to a relative position of one material layer or component with respect to other layers or components. For example, one layer deposited above or over or under another layer may be directly in contact with the other layer or may have one or more intervening layers. Moreover, one layer deposited between two layers may be directly in contact with the two layers or may have one or more intervening layers. In contrast, a first layer "on" a second layer is in direct contact with that second layer. Similarly, unless explicitly stated otherwise, one feature deposited between two features may be in direct contact with the adjacent features or may have one or more intervening layers.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. The terms "first," "second," "third," "fourth," etc. as used herein are meant as labels to distinguish among different elements and may not necessarily have an ordinal meaning according to their numerical designation.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of a transmitter, a receiver, a link geometry and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

What is claimed is:

1. A signaling circuit, comprising:
   a switch circuit to generate, from a first power supply voltage and a lower second power supply voltage, an internal reference supply voltage between the first power supply voltage and the lower second power supply voltage, and an internal lower supply voltage between the internal reference supply voltage and the lower second power supply voltage; and
   a transmit circuit to drive a data output from the first power supply voltage, for a high bit, and drive the data output from the internal lower supply voltage, for a low bit.

2. The signaling circuit of claim 1, further comprising:
   a first terminal of the data output connected to the internal reference supply voltage.

3. The signaling circuit of claim 2, further comprising:
   a receive circuit with a receive interface to connect to the data output of the transmit circuit and power supply interface to connect to the first power supply voltage and the lower second power supply voltage;
   the receive circuit having a differential amplifier with differential inputs to connect to a second terminal of the data output and the first terminal of the data output of the transmit circuit, and resistor termination across the differential inputs; and
   the receive circuit to receive signal current through the second terminal of the data output, and return the signal current through the first terminal of the data output; and
   the receive circuit to detect the high bit when driven on the data output and detect the low bit when driven on the data output, in a first mode.

4. The signaling circuit of claim 2, further comprising:
   a receive circuit as a separate component from the transmit circuit;
   a link to connect a second terminal of the data output to a corresponding second terminal of a receive interface of the receive circuit; and
   a geometry of the link having a first shared region to connect to the internal reference supply voltage through the first terminal of the data output.

5. The signaling circuit of claim 2, further comprising:
   a receive circuit with a receive interface to connect to a second terminal of the data output and the first terminal of the data output of the transmit circuit and power supply interface to connect to the first power supply voltage and the second power supply voltage;
   the receive circuit having a differential amplifier with differential inputs to connect to the first terminal and the second terminal of the data output of the transmit circuit;
   the receive circuit having a first resistor termination across the differential inputs in a first mode and a second resistor termination to the first power supply voltage in a second mode; and
   the receive circuit to compare a voltage level of the first terminal of the data output of the transmit circuit, as received through the receive interface, to a reference voltage, in the second mode.

6. The signaling circuit of claim 1, wherein the switch circuit comprises:
   a first capacitor between the first power supply voltage and the internal reference supply voltage;
   a second capacitor between the internal reference supply voltage and the internal lower supply voltage;
   at least an inductor; and
   a plurality of switches coupled to transfer charge from the first power supply voltage and the lower second power supply voltage to the at least the inductor and from the at least the inductor to each of the first capacitor and the second capacitor.

7. The signaling circuit of claim 1, further comprising:
   the switch circuit having an inductor and charging cycle logic to end a charging cycle with the inductor having zero current and zero voltage.

8. The signaling circuit of claim 1, wherein the signaling circuit is on an integrated circuit having connections for an external inductor and an external capacitor, for the switch circuit.

9. The signaling circuit of claim 1, wherein the switch circuit comprises:
   a first capacitor, a second capacitor, and at least an inductor in series with a third capacitor;
   a plurality of pass gates coupled to the first capacitor, the second capacitor, and the inductor in series with the third capacitor;
   a first voltage comparator coupled to the first capacitor to compare a voltage of the first capacitor to a first reference voltage;
   a second voltage comparator coupled to the second capacitor to compare a voltage of the second capacitor to a second reference voltage; and
   switch logic to switch the plurality of pass gates based on outputs of the first voltage comparator, the second voltage comparator, and measurement of a current or voltage of the at least the inductor in series with the third capacitor.

10. A method, comprising:
    generating, in a switch circuit, an internal reference supply voltage between a first power supply voltage and a lower second power supply voltage, from the first and lower second power supply voltages;
    generating, in the switch circuit, an internal lower supply voltage between the internal reference supply voltage and the lower second power supply voltage, from the first and lower second power supply voltages;
    driving, in a transmit circuit, a data output from the first power supply voltage, for a high bit; and driving, in the transmit circuit, the data output from the internal lower supply voltage, for a low bit, wherein a first terminal of the data output is connected to the internal reference supply voltage.

11. The method of claim 10, further comprising:
providing a current-return path back through the first terminal of the data output and generation of the internal reference supply voltage, for data bits driven out through a second terminal of the data output.

12. The method of claim 10, further comprising:
detecting, utilizing a differential amplifier with resistor termination across differential inputs in a receive circuit having a power supply interface connected to the first power supply voltage and the lower second power supply voltage, the high bit on a second terminal of the data output relative to the first terminal of the data output;
detecting, utilizing the differential amplifier in the receive circuit, the low bit on the second terminal of the data output relative to the first terminal of the data output; and
returning, through the resistor termination and the receive circuit, signal current received through the second terminal of the data output back through the first terminal of the data output, to the internal reference supply voltage.

13. The method of claim 10, further comprising:
conducting return current of data signaling of a second terminal of the data output back to the first terminal of the data output and the internal reference supply voltage, through a first shared region of a link that splits into impedance matched multiple regions each accompanying a data signal, and rejoins into a second shared region, wherein the link connects the transmit circuit, as a portion of a first component, and a receive circuit, as a portion of a second, separate component.

14. The method of claim 10, further comprising:
comparing, in a receive circuit, a voltage level of a second terminal of the data output of the transmit circuit as received through a receive interface, to a reference voltage in a second mode with the receive circuit having a second resistor termination to the first power supply voltage, wherein the receive circuit has a first resistor termination across differential inputs in a first mode.

15. The method of claim 10, wherein the generating the internal reference supply voltage and the internal lower supply voltage comprises spacing the first power supply voltage, the internal reference supply voltage and the internal lower supply voltage equally, to within a first tolerance, and further comprising:
supplying a same amount of supply current through the first power supply voltage and the lower second power supply voltage for driving the low bit as for driving the high bit, to within a second tolerance.

16. The method of claim 10, wherein the generating the internal reference supply voltage and the internal lower supply voltage comprises:
transferring, through a plurality of switches, charge from the first power supply voltage and the lower second power supply voltage to at least an inductor and from the at least an inductor to each of a first capacitor between the first power supply voltage and the internal reference supply voltage, and a second capacitor between the internal reference supply voltage and the internal lower supply voltage.

17. The method of claim 10, further comprising:
ending each of a plurality of charging cycles with an inductor of the switch circuit having zero current and zero voltage.

18. The method of claim 10, wherein the generating the internal reference supply voltage and the internal lower supply voltage comprises:
comparing a voltage of a first capacitor to a first reference voltage;
comparing a voltage of a second capacitor to a second reference voltage;
comparing a voltage of an inductor in series with a third capacitor, or a voltage of a resistor in series with the inductor, to a third reference voltage; and
switching a plurality of pass gates coupled to the first capacitor, the second capacitor and the inductor in series with the third capacitor, based on such comparing.

* * * * *